United States Patent [19]

Kondo et al.

[11] Patent Number: 5,431,833
[45] Date of Patent: Jul. 11, 1995

[54] LUBRICANT AND MAGNETIC RECORDING MEDIUM THEREWITH

[75] Inventors: Hirofumi Kondo; Toshiharu Uchimi; Yukihiro Koshika, all of Miyagi, Japan

[73] Assignee: Sony Corporation, Tokyo, Japan

[21] Appl. No.: 147,549

[22] Filed: Nov. 5, 1993

[30] Foreign Application Priority Data

Nov. 6, 1992 [JP] Japan .................................. 4-321478

[51] Int. Cl.⁶ .......................................... C10M 105/54
[52] U.S. Cl. .............................. 252/54.006; 427/128; 427/131; 428/422; 428/900
[58] Field of Search ............... 252/54.6; 428/900, 422; 427/128, 131

[56] References Cited

U.S. PATENT DOCUMENTS

| | | | |
|---|---|---|---|
| 3,646,112 | 2/1972 | Sterling, Jr. | 252/54.6 |
| 4,096,079 | 6/1978 | Pardee | 252/54.6 |
| 4,188,434 | 2/1980 | Loran | 252/54.6 |
| 4,232,072 | 11/1980 | Pardee | 252/54.6 |
| 4,912,252 | 3/1990 | Dekura et al. | 252/54.6 |
| 5,004,554 | 4/1991 | Tohzuka et al. | 252/54.6 |

*Primary Examiner*—Jacqueline V. Howard
*Attorney, Agent, or Firm*—Hill, Steadman & Simpson

[57] ABSTRACT

A lubricant contains ester compound made of perfluoropolyether and long chain alkyl carboxylic acid or alcohol. The perfluoropolyether has hydroxyl or carboxyl group at its end. The ester compound is admixed with long chain alkyl amine of from 0.01 to 100 in mole ratio. The long chain alkyl may be partially fluorined or perfluoro alkyl. At least one of phosphoric ester, phosphorous ester and long chain carboxylate ester can be further admixed. A magnetic recording medium can be coated by the lubricant.

12 Claims, No Drawings

LUBRICANT AND MAGNETIC RECORDING MEDIUM THEREWITH

BACKGROUND OF THE INVENTION

1. Field of the Invention

This invention relates to lubricant with perfluoropolyether and a magnetic recording medium having such a lubricant.

2. Background

There has been developed a magnetic recording medium of the thin metal layer type, in which a magnetic layer is formed on a non-magnetic base film by means of, for example, evaporating ferromagnetic metal material. In such a medium, the surface of magnetic layer is so smooth that substantial contacting area may become large against transporting elements such as magnetic heads and guide rollers. Since the coefficient of friction also becomes large, it causes some problems such as a sticking phenomena inviting unstabilized running characteristics and poor durability.

The use of many kinds of lubricant has been considered to improve the problem. It has been tried to decrease the coefficient of friction by coating higher fatty acid and its ester on the surface of magnetic layer of magnetic recording medium.

As the lubricant for use in the magnetic recording medium, there are very severe requirements on its characteristics. Up to the present, no conventional lubricant has completely satisfied the requirements. The following describes the requirements for the lubricant for use in the magnetic recording medium.

[1] To have an excellent low temperature characteristic to secure a certain lubricant effect when using in very cold area;

[2] To be able to coat as an extremely thin film without causing any problem due to the space between a magnetic head, but with a sufficient lubricant characteristics; and

[3] To have a long life time maintaining its lubricant effect after the use for long hours.

The conventional higher fatty acid and its ester become frozen and solidified in low temperature condition such as below zero centigrade. Therefore, it loses the function as a lubricant and tends to have no durability after the use for long hours.

The practical characteristics such as running characteristic and durability have not been satisfied yet because of the lack of ability of lubricant in use in the field of magnetic recording medium.

SUMMARY OF THE INVENTION

It is an object of the invention to provide a lubricant having an excellent lubricant characteristics for the use under various conditions.

It is another object of the invention to provide a lubricant to maintain its lubricant effect for a long time.

It is a further object of the invention to provide a magnetic recording medium, containing the above lubricant, with excellent running characteristics, wear characteristics and durability.

These and other objects, advantages and features of the invention will become apparent to those skilled in the art upon consideration of the following description of the invention.

In one aspect of the invention, a lubricant contains ester compound made of perfluoropolyether and long chain carboxylic acid or alcohol. The perfluoropolyether has hydroxyl or carboxyl group at its end. The ester compound is admixed with long chain hydrocarbon amine.

In another aspect of the invention, a magnetic recording tape is provided to have the surface of magnetic layer covered by the lubricant containing ester compound made of perfluoropolyether and long chain carboxylic acid or alcohol. The ester compound is admixed with long chain hydrocarbon amine.

In accordance with the present invention, improvement on the solubility can be expected by esterifying perfluoropolyether. It becomes unnecessary to use freon as a diluent. The lubricant has excellent lubricant effect under any condition and keeps it for a long time. The magnetic recording medium with this lubricant therefore has excellent wear characteristics, durability and in particular outstanding running characteristics.

DESCRIPTION OF THE INVENTION

The lubricants as the first to fourth embodiments of the invention have ester compound of perfluoropolyether respectively admixed by long chain hydrocarbon amine (see, general formula [15]).

The ester compound utilized here includes the followings.

(A) Compound of perfluoropolyether having hydroxyl group at its end and long chain carboxylic acid (see, general formula [11]).

(B) Compound of perfluoropolyether having hydroxyl group at its end and partially fluorined long chain carboxylic acid (see, general formula [12]).

(C) Compound of perfluoropolyether having carboxyl group at its end and partially fluorined long chain alcohol (see, general formula [13]).

(D) Compound of perfluoropolyether having hydroxyl group at its end and perfluoro carboxylic acid (see, general formula [14]).

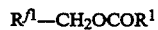

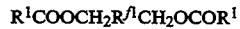 general formula [11]

(where $R^{f1}$ shows perfluoropolyether group and $R^1$ shows long chain hydrocarbon)

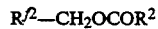

 general formula [12]

(where $R^{f2}$ shows perfluoropolyether group and $R^2$ shows partially fluorined long chain hydrocarbon)

 general formula [13]

(where $R^{f3}$ shows perfluoropolyether group and $R^3$ shows partially fluorined long chain hydrocarbon)

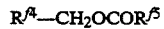

 general formula [14]

(where $R^{f4}$ shows perfluoropolyether group and $R^{f5}$ shows perfluoro hydrocarbon)

RNH$_2$        general formula [15]

(where R shows hydrocarbon)

The lubricants as the fifth and sixth embodiments of the invention have ester compound as explained below of perfluoropolyether admixed by long chain hydrocarbon amine (see, general formula [15]) and further admixed by at least more than one of phosphoric ester, phosphorous ester and long chain carboxylate ester.

The ester compound utilized here includes the compound shown by the general formula [11] and the compound of perfluoropolyether having long chain alcohol (see, general formula [16]).

$R^{f6}$—COOR$^6$ $R^6$OCOR$^{f6}$COOR$^6$        general formula [16]

(where R$^{f6}$ shows perfluoropolyether group and R$^6$ shows perfluoro hydrocarbon)

The lubricant of the invention has ester compound (shown by general formulas [11], [12], [13], [14] and [16]) of perfluoropolyether with respective long chain hydrocarbon group (such as R$^1$, R$^2$, R$^3$ and R$^4$, etc.). The long chain hydrocarbon group can be selected regardless of the differences on its molecular weight, branch structure, unsaturated coupling, isomer structure and alicyclic structure. However, considering its solubility, it is preferable to have the carbon number more than six. The structures will be shown later, more in detail by the embodiments.

The long chain hydrocarbon group as the admixed long chain hydrocarbon amine (shown by R in the general formula [15]). This alkyl group can be also selected regardless of the differences on its molecular weight, carbon number, branch structure, unsaturated coupling, existence aromatic cycle, isomer structure and alicyclic structure. Considering its coefficient of friction, it is preferable to have the long chain hydrocarbon with the carbon number more than ten.

The structure of perfluoropolyether having hydroxyl group at its end is shown by a general formula [17] as multifunctional and also by a general formulas [18] and [19] as monofunctional. The structure of perfluoropolyether having carboxyl group at its end is shown by a general formula [20] as multifunctional and also by a general formulas [21] and [22] as monofunctional.

HOCH$_2$CF$_2$(OC$_2$F$_4$)$_p$(OCF$_2$)$_q$OCF$_2$CH$_2$OH    general formula [17]

F(CF$_2$CF$_2$CF$_2$O)$_n$CF$_2$CF$_2$CH$_2$OH    general formula [18]

CF$_3$(OCF(CF$_3$)CF$_2$)$_m$(OCF$_2$)$_l$CH$_2$OH    general formula [19]

HOOCCF$_2$(OC$_2$F$_4$)$_p$(OCF$_2$)$_q$OCF$_2$COOH    general formula [20]

F(CF$_2$CF$_2$CF$_2$O)$_n$CF$_2$CF$_2$COOH    general formula [21]

CF$_3$(OCF(CF$_3$)CF$_2$)$_m$(OCF$_2$)$_l$COOH    general formula [22]

In these chemical formulas, the suffix (l), (m) and (n) means the integer numbers more than one. However, the chemical structure of perfluoropolyether doesn't have such limitations.

Though the molecular weight of perfluoropolyether doesn't have any particular limitation, it is preferable to have approximately 600 to 5000. When the molecular weight becomes too large, the effect of end group becomes small and more freon is needed to dissolve it. On the other hand, when the molecular weight becomes too small, the effect of perfluoropolyether group becomes very small.

In the lubricant of this invention, the long chain hydrocarbon amine is admixed within the range of molar ratio 0.01 to 100 to the ester compound of each perfluoropolyether.

The magnetic recording medium of this invention has at least one of the lubricant of this invention coated on the surface of its magnetic layer which is formed on its non-magnetic base film.

By coating the above described lubricant on the surface of thin film magnetic recording medium such as an evaporated tape, the magnetic recording medium of this invention can obtain and maintain the excellent durability under severe conditions such as high temperature and high humidity or low temperature and low humidity.

This invention can be applied to the magnetic recording medium of the thin metal film type, in which a magnetic film layer can be formed on the non-magnetic base film by means of evaporation. It can be also applied to the magnetic medium of the thin metal film type, in which an under coating layer is formed between the magnetic film layer and the non-magnetic base film.

The materials for the non-magnetic base film and the thin metal magnetic film have no limitations to be applied for the magnetic recording medium of the thin metal film type of this invention. In other words, any conventional material known to public can be utilized.

For example, the materials as follows can be used by the method of plated coat, sputtering or PVD such as vacuum evaporation so as to form a continuous thin magnetic film of metal. They are metal such as Fe, Co or Ni; alloys to become magnetic recording film for surface magnetization such as Co/Ni, Co/Pt, Co/Pt/Ni, FE/Co, Fe/Ni, Fe/Ni/B, Fe/Co/B, Fe/Co/Ni/B; alloy thin film like Co/Cr.

In particular for the magnetic recording thin metal film, non-magnetic materials with low melting point such as Bi, Sb, Pb, Sn, Ga, In, Ge, Si or Ti can be previously coated on the non-magnetic base film so as to create the under coating layer. Thereafter, the metal magnetic materials as above can be evaporated or sputtered from a perpendicular direction. By doing so, the non-magnetic materials with low melting point is diffused into the metal magnetic thin film so that the surface isotropy can be secured by realigning orientation and retentivity can be improved.

When using the metal magnetic thin film as a hard disk, a hard protective layer may be formed on the surface by a carbon film, a diamond or amorphous carbon film, a chromium oxide film, a zirconium oxide film or a silicon oxide film.

The material for the non-magnetic base film has no limitations and therefore any conventional material known to public can be utilized. For example, when using a hard base plate such as an aluminum alloy plate or a glass plate, an oxide coating by Alumilite procedure or an Ni/P alloy coating may be performed on the surface of base plate so as to make the surface hard.

One of the method for making magnetic recording medium have the above lubricant is making the lubricant layer top coated on the surface of the metal magnetic thin film layer or the above mentioned protective layers. At this time, as the amount for coating of lubricant, it is preferable to have 0.5-100 mg/m$^2$ and more preferably 1-20 mg/m$^2$.

The lubricant of this invention can be utilized alone as the lubricant for magnetic recording medium, but can be also utilized combined with conventional lubricant.

Further, to maintain the lubricant effect under more severe condition, an extreme pressure agent may be used together as a combination of 30:70-70:30 in weight ratio.

The extreme pressure agent is reacted with the metal surface by frictional heat being generated when metal contact partially occurs in the boundary lubrication region. The reactively generated coating is therefore formed for preventing friction and wear. The extreme pressure agent of phosphorus group, sulfur group, halogen group, organometallic type and composite type can be respectively available.

Furthermore, an anticorrosion agent can be used together if necessary as well as the above lubricant and extreme pressure agent. The anticorrosion available for this kind of magnetic recording medium has been well known, such as heterocyclic compounds of phenols group, naphthol group, quinoues group, nitrogen, oxygen and sulfur.

In the magnetic recording medium of thin metal film type, a back coat layer or an undercoat layer may be also formed depending on the necessity in addition to the metal magnetic thin film as the magnetic layer.

For example, similar to the magnetic coating film, carbon group fine powder can be added to give conductivity of resin binding agent. Also, inorganic pigment can be added to control the roughness of surface to form the back coat layer.

In accordance with this invention, the above lubricant can be added into the back coat layer. Of course, it can be contained by the top coating. Various combination can be also possible for example adding the lubricant of the invention into all of the magnetic coating film, metal magnetic thin film and back coat layer in addition to the top coating.

The lubricant of the invention has an excellent lubricant effect to reduce the coefficient of friction. This lubricant effect is not lost under severe condition like low temperature. By esterifying perfluoropolyether, the lubricant becomes easy to dissolve by solvent other than freon. The use of freon group solvent can be therefore decreased or omitted by the lubricant of the invention.

Since the magnetic recording medium of the invention has the lubricant with higher lubricant effect, it avoids friction against the transport elements such as a magnetic head and guide rollers and therefore has excellent wear characteristics, durability and running characteristics.

Characteristics of the lubricant and the magnetic recording medium therewith will be explained below in accordance with the first to fifth embodiments in order.

EXPERIMENTATION A

The lubricant of the first embodiment contains ester compound made of perfluoropolyether with hydroxyl group at its end and long chain carboxylic acid, which is admixed with long chain hydrocarbon amine.

The ester compound is composed of a solution of perfluoropolyether with hydroxyl group at its end and third grade amine added by dropping long chain carboxylic acid chloride. The reaction has been completed under reflux and heat after dropping. The solution was then cooled to the room temperature to generate amine salt. It was washed by distilled water and then purified by silica gel column chromatography.

The ester compound was thus composed of and thereafter added with long chain hydrocarbon amine so as to become the lubricants A1-A14. The long chain hydrocarbon amine was added two times mole than perfluoropolyether, in other words, equal mole to carbonyl group. However, equal mole amine was added to the monofunctional perfluoropolyether.

The composition and molecular weight of the functional groups $R^{f1}$, $R^1$ and $R$ in the general formulas [11] to [15] are described for respective lubricants in the following Table 1.

TABLE 1

| No. | $R^{f1}$ | MW | $R^1$ | R |
|---|---|---|---|---|
| A1 | $CF_2(OC_2F_4)_p(OCF_2)_qOCF_2$ | 2000 | $C_{18}H_{37}$ | $C_{18}H_{37}$ |
| A2 | $CF_2(OC_2F_4)_p(OCF_2)_qOCF_2$ | 2000 | $C_{16}H_{33}$ | $C_{16}H_{33}$ |
| A3 | $CF_2(OC_2F_4)_p(OCF_2)_qOCF_2$ | 2000 | $C_{14}H_{29}$ | $C_{14}H_{29}$ |
| A4 | $CF_2(OC_2F_4)_p(OCF_2)_qOCF_2$ | 2000 | $C_{12}H_{25}$ | $C_{10}H_{21}$ |
| A5 | $CF_2(OC_2F_4)_p(OCF_2)_qOCF_2$ | 2000 | $C_{18}H_{35}$ | $C_{18}H_{37}$ |
| A6 | $CF_2(OC_2F_4)_p(OCF_2)_qOCF_2$ | 2000 | iso-$C_{18}H_{37}$ | $C_{18}H_{37}$ |
| A7 | $CF_2(OC_2F_4)_p(OCF_2)_qOCF_2$ | 4000 | $C_{18}H_{31}$ | $C_{18}H_{31}$ |
| A8 | $F(CF_2CF_2CF_2O)_nCF_2CF_2$ | 3500 | $C_{18}H_{37}$ | $C_{18}H_{37}$ |
| A9 | $F(CF_2CF_2CF_2O)_nCF_2CF_2$ | 3500 | $C_{18}H_{37}C_6H_4$ | $C_{18}H_{37}$ |
| A10 | $F(CF_2CF_2CF_2O)_nCF_2CF_2$ | 3500 | $C_6H_{11}$ (Cyclo hexyl) | $C_6H_{11}$ (Cyclo hexyl) |
| A11 | $F(CF_2CF_2CF_2O)_nCF_2CF_2$ | 3500 | $C_{24}H_{49}$ | $C_{18}H_{37}C_6H_4$ |
| A12 | $CF_3(OCF(CF_3)CF_2)_m(OCF_2)_1$ | 650 | $C_{18}H_{37}$ | iso-$C_{18}H_{37}$ |
| A13 | $CF_3(OCF(CF_3)CF_2)_m(OCF_2)_1$ | 650 | $CH_2=CHC_{16}H_{32}$ | $C_{18}H_{37}$ |
| A14 | $CF_3(OCF(CF_3)CF_2)_m(OCF_2)_1$ | 650 | iso-$C_{18}H_{37}$ | $CH_2=CHC_{16}H_{32}$ |

The above lubricants are coated on the surface of magnetic layer to make the magnetic recording medium. The example will be explained below, which apply to the magnetic recording medium of metal thin film type (evaporated tape).

The cobalt adheres to polyethylene terephthalate film with 14 μm thickness by means of oblique evaporation method so that the ferromagnetic metal thin film are formed having 200 nm thickness. The lubricant A1 shown in Table 1 is dissolved into n-hexane and coated on the surface of the metal magnetic thin film so that the amount of coating can become 5 mg/m$^2$. The sample tape of the first example A1 is so made after cutting it to have 8 mm width. The sample tapes of examples A2-A14 are made by the same way as one of the example A1 except for using the lubricants A2–A14 rather than the lubricant A1.

With respect to each sample tape, the coefficient of friction, still durability and shuttle durability are measured respectively at [a] temperature 25 centigrade, humidity 60%, [b] temperature −5 centigrade and [c] temperature 40 centigrade, humidity 80%. The still durability is judged by evaluating the time when the output disappears during a pause mode. The shuttle durability is judged by an evaluation after the repeated playback (shuttle running) for two minutes. In particular by evaluating the numbers of shuttle running up to when the output decreases 3 dB.

These results are shown in Tables 2 and 3.

TABLE 2

| | Condition | Coefficient of Friction | Still Durability (Min.) | Shuttle Durability (Times) |
|---|---|---|---|---|
| Example A1 | 25° C., 60% RH | 0.15 | >120 | >150 |
| (Lubricant A1) | 40° C., 80% RH | 0.19 | >120 | >150 |
| | −5° C. | 0.16 | >120 | >150 |
| Example A2 | 25° C., 60% RH | 0.16 | >120 | >150 |
| (Lubricant A2) | 40° C., 80% RH | 0.20 | >120 | >150 |
| | −5° C. | 0.17 | >120 | >150 |
| Example A3 | 25° C., 60% RH | 0.16 | >120 | >150 |
| (Lubricant A3) | 40° C., 80% RH | 0.20 | >120 | >150 |
| | −5° C. | 0.17 | >120 | >150 |
| Example A4 | 25° C., 60% RH | 0.16 | >120 | >150 |
| (Lubricant A4) | 40° C., 80% RH | 0.19 | >120 | >150 |
| | −5° C. | 0.17 | >120 | >150 |
| Example A5 | 25° C., 60% RH | 0.16 | >120 | >150 |
| (Lubricant A5) | 40° C., 80% RH | 0.21 | >120 | >150 |
| | −5° C. | 0.17 | >120 | >150 |
| Example A6 | 25° C., 60% RH | 0.17 | >120 | >150 |
| (Lubricant A6) | 40° C., 80% RH | 0.22 | >120 | >150 |
| | −5° C. | 0.18 | >120 | >150 |
| Example A7 | 25° C., 60% RH | 0.17 | >120 | >150 |
| (Lubricant A7) | 40° C., 80% RH | 0.22 | >120 | >150 |
| | −5° C. | 0.17 | >120 | >150 |

TABLE 3

| | Condition | Coefficient of Friction | Still Durability (Min.) | Shuttle Durability (Times) |
|---|---|---|---|---|
| Example A8 | 25° C., 60% RH | 0.16 | >120 | >150 |
| (Lubricant A8) | 40° C., 80% RH | 0.22 | >120 | >150 |
| | −5° C. | 0.17 | >120 | >150 |
| Example A9 | 25° C., 60% RH | 0.19 | >120 | >150 |
| (Lubricant A9) | 40° C., 80% RH | 0.23 | >120 | >150 |
| | −5° C. | 0.19 | >120 | >150 |
| Example A10 | 25° C., 60% RH | 0.17 | >120 | >150 |
| (Lubricant A10) | 40° C., 80% RH | 0.21 | >120 | >150 |
| | −5° C. | 0.18 | >120 | >150 |
| Example A11 | 25° C., 60% RH | 0.16 | >120 | >150 |
| (Lubricant A11) | 40° C., 80% RH | 0.19 | >120 | >150 |
| | −5° C. | 0.16 | >120 | >150 |
| Example A12 | 25° C., 60% RH | 0.16 | >120 | >150 |
| (Lubricant A12) | 40° C., 80% RH | 0.20 | >120 | >150 |
| | −5° C. | 0.16 | >120 | >150 |
| Example A13 | 25° C., 60% RH | 0.16 | >120 | >150 |
| (Lubricant A13) | 40° C., 80% RH | 0.21 | >120 | >150 |
| | −5° C. | 0.17 | >120 | >150 |
| Example A14 | 25° C., 60% RH | 0.18 | >120 | >150 |
| (Lubricant A14) | 40° C., 80% RH | 0.23 | >120 | >150 |
| | −5° C. | 0.18 | >120 | >150 |

For the purpose of comparison, a sample tape (comparison example A1) is prepared without using any lubricant. The sample tapes (comparison example A2, A3 and A4) are prepared with a lubricant made by perfluoropolyether alone having carboxyl group at its end (shown by general formulas [20], [21] and [22]). The result of durability measurement is shown in Table 4.

TABLE 4

| | Condition | Coefficient of Friction | Still Durability (Min.) | Shuttle Durability (Times) |
|---|---|---|---|---|
| Comparison Example A1 (without Lubricant) | 25° C., 60% RH | 0.9 | 2 | 3 |
| | 40° C., 80% RH | — | — | — |
| | −5° C. | — | — | — |
| Comparison Example A2 | 25° C., 60% RH | 0.20 | >120 | >150 |
| | 40° C., 80% RH | 0.30 | 91 | 55 |
| | −5° C. | 0.21 | 51 | 60 |
| Comparison Example A3 | 25° C., 60% RH | 0.24 | >120 | 120 |
| | 40° C., 80% RH | 0.32 | 76 | 46 |
| | −5° C. | 0.25 | 29 | 40 |
| Comparison Example A4 | 25° C., 60% RH | 0.20 | 95 | 120 |
| | 40° C., 80% RH | 0.27 | 67 | 35 |
| | −5° C. | 0.21 | 20 | 30 |

The sample tapes as examples of the invention have the lubricant containing ester compound made of perfluoropolyether with carboxyl group at its end and long chain alcohol, which is admixed with long chain alkyl amine. With these sample tapes, the relationship between the added amount of amine and its coefficient of friction is examined.

With respect to the lubricant A1, different amount of amine are added to the ester compound by changing them from 0.01 to 100 mole ratio. The coefficients of friction are measured for these sample tapes. Tables 5 and 6 show the coefficients of friction depending on mole ratio of amine and three different conditions.

TABLE 5

| Amine Molar Ratio | Condition | Coefficient of Friction |
|---|---|---|
| 100 | 25° C., 60% RH | 0.23 |
| | 40° C., 80% RH | 0.26 |
| | −5° C. | 0.24 |
| 50 | 25° C., 60% RH | 0.22 |
| | 40° C., 80% RH | 0.25 |
| | −5° C. | 0.23 |
| 9 | 25° C., 60% RH | 0.21 |
| | 40° C., 80% RH | 0.25 |
| | −5° C. | 0.22 |
| 4 | 25° C., 60% RH | 0.18 |
| | 40° C., 80% RH | 0.21 |
| | −5° C. | 0.19 |
| 2.33 | 25° C., 60% RH | 0.17 |
| | 40° C., 80% RH | 0.20 |
| | −5° C. | 0.17 |
| 1.5 | 25° C., 60% RH | 0.16 |
| | 40° C., 80% RH | 0.19 |
| | −5° C. | 0.16 |
| 1 | 25° C., 60% RH | 0.15 |
| | 40° C., 80% RH | 0.19 |
| | −5° C. | 0.16 |

TABLE 6

| Amine Molar Ratio | Condition | Coefficient of Friction |
|---|---|---|
| 0.67 | 25° C., 60% RH | 0.15 |
| | 40° C., 80% RH | 0.18 |
| | −5° C. | 0.15 |
| 0.43 | 25° C., 60% RH | 0.15 |
| | 40° C., 80% RH | 0.18 |
| | −5° C. | 0.16 |
| 0.25 | 25° C., 60% RH | 0.16 |
| | 40° C., 80% RH | 0.18 |
| | −5° C. | 0.16 |
| 0.10 | 25° C., 60% RH | 0.16 |
| | 40° C., 80% RH | 0.19 |
| | −5° C. | 0.17 |

TABLE 6-continued

| Amine Molar Ratio | Condition | Coefficient of Friction |
|---|---|---|
| 0.05 | 25° C., 60% RH | 0.17 |
|  | 40° C., 80% RH | 0.20 |
|  | −5° C. | 0.18 |
| 0.02 | 25° C., 60% RH | 0.18 |
|  | 40° C., 80% RH | 0.21 |
|  | −5° C. | 0.18 |
| 0.01 | 25° C., 60% RH | 0.19 |
|  | 40° C., 80% RH | 0.23 |
|  | −5° C. | 0.20 |
| 0 | 25° C., 60% RH | 0.29 |
|  | 40° C., 80% RH | 0.43 |
|  | −5° C. | 0.29 |

Similarly, with respect to the lubricant A5, different amount of amine are added to the ester compound by changing them from 0.01 to 100 mole ratio. The coefficients of friction are measured for these sample tapes. Tables 7 and 8 show the coefficients of friction depending on mole ratio of amine and three different conditions.

TABLE 7

| Amine Molar Ratio | Condition | Coefficient of Friction |
|---|---|---|
| 100 | 25° C., 60% RH | 0.21 |
|  | 40° C., 80% RH | 0.22 |
|  | −5° C. | 0.21 |
| 50 | 25° C., 60% RH | 0.20 |
|  | 40° C., 80% RH | 0.21 |
|  | −5° C. | 0.21 |
| 9 | 25° C., 60% RH | 0.19 |
|  | 40° C., 80% RH | 0.21 |
|  | −5° C. | 0.20 |
| 4 | 25° C., 60% RH | 0.19 |
|  | 40° C., 80% RH | 0.21 |
|  | −5° C. | 0.19 |
| 2.33 | 25° C., 60% RH | 0.18 |
|  | 40° C., 80% RH | 0.21 |
|  | −5° C. | 0.19 |
| 1.5 | 25° C., 60% RH | 0.17 |
|  | 40° C., 80% RH | 0.21 |
|  | −5° C. | 0.18 |
| 1 | 25° C., 60% RH | 0.16 |
|  | 40° C., 80% RH | 0.22 |
|  | −5° C. | 0.17 |

TABLE 8

| Amine Molar Ratio | Condition | Coefficient of Friction |
|---|---|---|
| 0.67 | 25° C., 60% RH | 0.16 |
|  | 40° C., 80% RH | 0.20 |
|  | −5° C. | 0.17 |
| 0.43 | 25° C., 60% RH | 0.17 |
|  | 40° C., 80% RH | 0.20 |
|  | −5° C. | 0.17 |
| 0.25 | 25° C., 60% RH | 0.17 |
|  | 40° C., 80% RH | 0.21 |
|  | −5° C. | 0.18 |
| 0.10 | 25° C., 60% RH | 0.18 |
|  | 40° C., 80% RH | 0.21 |
|  | −5° C. | 0.18 |
| 0.05 | 25° C., 60% RH | 0.19 |
|  | 40° C., 80% RH | 0.21 |
|  | −5° C. | 0.19 |
| 0.02 | 25° C., 60% RH | 0.19 |
|  | 40° C., 80% RH | 0.21 |
|  | −5° C. | 0.19 |
| 0.01 | 25° C., 60% RH | 0.19 |
|  | 40° C., 80% RH | 0.22 |
|  | −5° C. | 0.20 |

The lubricants have been compared between the perfluoropolyether alone with carboxyl group at its end and the ester compound of perfluoropolyether with carboxyl group and long chain alcohol admixed with long chain hydrocarbon amine of from 0.01 to 100 mole ratio. It was found that the latter could obtain the better result under various conditions such as friction coefficient, still durability and shuttle durability.

The solubility has been also considered with respect to the ester compound of perfluoropolyether with carboxyl group at its both ends and long chain alcohol (utilized as the lubricant A1). The ester is soluble in toluene, hexane as well as freon. As the long chain hydrocarbon amine is also soluble in toluene and hexane the lubricant A1 is soluble in toluene and hexane.

Therefore, the ester compound of perfluoropolyether with carboxyl group at its end and long chain alcohol admixed with long chain hydrocarbon amine can be utilized as a lubricant with the excellent lubricant effect without using freon.

The identification for the composed ester of perfluoropolyether with carboxyl group at the end and long chain alcohol has been examined by the infrared absorption spectrum. The stretching vibration of the hydroxyl group of 3600 $cm^{-1}$ disappeared. The stretching vibration of the CH can be found at 2920 $cm^{-1}$ and 2850 $cm^{-1}$. The stretching vibration of CO moves from 1760 $cm^{-1}$ to 1800 $cm^{-1}$. And the stretching vibration of the CF can be found from 1300 $cm^{-1}$ to 1060 $cm^{-1}$. So, the structure can be identified by those measurement.

EXPERIMENTATION B

The lubricant of the second embodiment contains ester compound made of perfluoropolyether having hydroxyl group at its end and partially fluorined long chain carboxylic acid admixed with long chain hydrocarbon amine.

The ester compound is composed of a solution of perfluoropolyether with hydroxyl group at its end and third grade amine added by dropping partially fluorined long chain carboxylic acid chloride. The reaction has been completed under reflux and heat after dropping. The solution was then cooled to the room temperature. The generated amine salt is washed by distilled water and then purified by silica gel column chromatography.

The partially fluorined long chain carboxylic acid chloride can be obtained by the method for example proposed by Brace and others (see, Journal of Organic Chemistry, Vol. 27, pp. 4491). By using chlorination agent such as thionyl chloride, the compound of partially fluorined long chain carboxylic acid can become acid chloride.

The ester compound was thus composed of and thereafter added with long chain hydrocarbon amine so as to become the lubricants B1-B14. The long chain hydrocarbon amine was added two times mole than two functional perfluoropolyether and equal to monofunctional perfluoropolyether, in other words, equal mole to carbonyl group.

The composition and molecular weight of the functional groups $Rf^2$, $R^2$ and $R$ in the general formulas [12] and [15] are described for respective lubricants in the following Table 9.

TABLE 9

| No. | $R_f^2$ | MW | $R^2$ | R |
|---|---|---|---|---|
| B1 | $CF_2(OC_2F_4)_p(OCF_2)_qOCF_2$ | 2000 | $C_8F_{17}C_{10}H_{20}$ | $C_{18}H_{37}$ |
| B2 | $CF_2(OC_2F_4)_p(OCF_2)_qOCF_2$ | 2000 | $C_7F_{15}C_{10}H_{20}$ | $C_{16}H_{33}$ |
| B3 | $CF_2(OC_2F_4)_p(OCF_2)_qOCF_2$ | 2000 | $C_{12}F_{25}C_{10}H_{20}$ | $C_{14}H_{29}$ |
| B4 | $CF_2(OC_2F_4)_p(OCF_2)_qOCF_2$ | 2000 | $C_2F_5C_{10}H_{20}$ | $C_{10}H_{21}$ |
| B5 | $CF_2(OC_2F_4)_p(OCF_2)_qOCF_2$ | 2000 | iso-$C_3F_7C_{10}H_{20}$ | $C_{18}H_{37}$ |
| B6 | $CF_2(OC_2F_4)_p(OCF_2)_qOCF_2$ | 2000 | iso-$C_3F_7C_9H_{18}$ | $C_{18}H_{37}$ |
| B7 | $CF_2(OC_2F_4)_p(OCF_2)_qOCF_2$ | 4000 | $C_{12}F_{25}C_6H_{12}$ | $C_{18}H_{31}$ |
| B8 | $F(CF_2CF_2CF_2O)_nCF_2CF_2$ | 3500 | $C_3F_7CH=CHC_8H_{16}$ | $C_{18}H_{37}$ |
| B9 | $F(CF_2CF_2CF_2O)_nCF_2CF_2$ | 3500 | $C_7F_{15}C_{16}H_{32}$ | $C_{18}H_{37}$ |
| B10 | $F(CF_2CF_2CF_2O)_nCF_2CF_2$ | 3500 | $(CF_3)_2CFC_6F_{12}C_{16}H_{32}$ | $C_6H_{11}$ (Cyclo hexyl) |
| B11 | $F(CF_2CF_2CF_2O)_nCF_2CF_2$ | 3500 | $C_8F_{17}C_{10}H_{20}$ | $C_{18}H_{37}C_6H_4$ |
| B12 | $CF_3(OCF(CF_3)CF_2)_m(OCF_2)_l$ | 650 | $C_8F_{17}C_{10}H_{20}$ | iso-$C_{18}H_{37}$ |
| B13 | $CF_3(OCF(CF_3)CF_2)_m(OCF_2)_l$ | 650 | $C_3F_7CH=CHC_8H_{16}$ | $C_{18}H_{37}$ |
| B14 | $CF_3(OCF(CF_3)CF_2)_m(OCF_2)_l$ | 650 | $C_7F_{15}C_{16}H_{32}$ | $CH_2=CHC_{16}H_{32}$ |

With these lubricants B1 to B14, the sample tapes as examples B1 to B14 are prepared by the same method as explained in the experimentation A. Regarding each sample tape, the friction coefficient, still and shuttle durabilities are measured by the same method as explained in the experimentation A. The results are shown in Tables 10 and 11.

TABLE 10

| | Condition | Coefficient of Friction | Still Durability (Min.) | Shuttle Durability (Times) |
|---|---|---|---|---|
| Example B1 (Lubricant B1) | 25° C., 60% RH | 0.15 | >120 | >150 |
| | 40° C., 80% RH | 0.19 | >120 | >150 |
| | −5° C. | 0.15 | >120 | >150 |
| Example B2 (Lubricant B2) | 25° C., 60% RH | 0.16 | >120 | >150 |
| | 40° C., 80% RH | 0.20 | >120 | >150 |
| | −5° C. | 0.16 | >120 | >150 |
| Example B3 (Lubricant B3) | 25° C., 60% RH | 0.16 | >120 | >150 |
| | 40° C., 80% RH | 0.20 | >120 | >150 |
| | −5° C. | 0.17 | >120 | >150 |
| Example B4 (Lubricant B4) | 25° C., 60% RH | 0.17 | >120 | >150 |
| | 40° C., 80% RH | 0.22 | >120 | >150 |
| | −5° C. | 0.18 | >120 | >150 |
| Example B5 (Lubricant B5) | 25° C., 60% RH | 0.16 | >120 | >150 |
| | 40° C., 80% RH | 0.22 | >120 | >150 |
| | −5° C. | 0.17 | >120 | >150 |
| Example B6 (Lubricant B6) | 25° C., 60% RH | 0.16 | >120 | >150 |
| | 40° C., 80% RH | 0.22 | >120 | >150 |
| | −5° C. | 0.18 | >120 | >150 |
| Example B7 (Lubricant B7) | 25° C., 60% RH | 0.17 | >120 | >150 |
| | 40° C., 80% RH | 0.23 | >120 | >150 |
| | −5° C. | 0.17 | >120 | >150 |

TABLE 11

| | Condition | Coefficient of Friction | Still Durability (Min.) | Shuttle Durability (Times) |
|---|---|---|---|---|
| Example B8 (Lubricant B8) | 25° C., 60% RH | 0.16 | >120 | >150 |
| | 40° C., 80% RH | 0.22 | >120 | >150 |
| | −5° C. | 0.17 | >120 | >150 |
| Example B9 (Lubricant B9) | 25° C., 60% RH | 0.16 | >120 | >150 |
| | 40° C., 80% RH | 0.19 | >120 | >150 |
| | −5° C. | 0.16 | >120 | >150 |
| Example B10 (Lubricant B10) | 25° C., 60% RH | 0.17 | >120 | >150 |
| | 40° C., 80% RH | 0.22 | >120 | >150 |
| | −5° C. | 0.18 | >120 | >150 |
| Example B11 (Lubricant B11) | 25° C., 60% RH | 0.17 | >120 | >150 |
| | 40° C., 80% RH | 0.20 | >120 | >150 |
| | −5° C. | 0.17 | >120 | >150 |
| Example B12 (Lubricant B12) | 25° C., 60% RH | 0.17 | >120 | >150 |
| | 40° C., 80% RH | 0.21 | >120 | >150 |
| | −5° C. | 0.18 | >120 | >150 |
| Example B13 (Lubricant B13) | 25° C., 60% RH | 0.17 | >120 | >150 |
| | 40° C., 80% RH | 0.22 | >120 | >150 |
| | −5° C. | 0.18 | >120 | >150 |
| Example B14 (Lubricant B14) | 25° C., 60% RH | 0.17 | >120 | >150 |
| | 40° C., 80% RH | 0.21 | >120 | >150 |
| | −5° C. | 0.17 | >120 | >150 |

For the purpose of comparison, a sample tape (comparison example B1) is prepared without using any lubricant. The sample tapes (comparison example B2, B3 and B4) are prepared with lubricants made by perfluoropolyether alone having hydroxyl group at its end (shown in general formula [17], [18] and [19]). The result of durability measurement is shown in Table 12.

TABLE 12

| | Condition | Coefficient of Friction | Still Durability (Min.) | Shuttle Durability (Times) |
|---|---|---|---|---|
| Comparison Example B1 (without | 25° C., 60% RH | 0.9 | 2 | 3 |
| | 40° C., 80% RH | — | — | — |
| | −5° C. | — | — | — |

TABLE 12-continued

|  | Condition | Coefficient of Friction | Still Durability (Min.) | Shuttle Durability (Times) |
|---|---|---|---|---|
| Lubricant) | | | | |
| Comparison | 25° C., 60% RH | 0.20 | >120 | >150 |
| Example B2 | 40° C., 80% RH | 0.30 | 91 | 55 |
|  | −5° C. | 0.21 | 51 | 60 |
| Comparison | 25° C., 60% RH | 0.24 | >120 | 120 |
| Example B3 | 40° C., 80% RH | 0.32 | 76 | 46 |
|  | −5° C. | 0.25 | 29 | 40 |
| Comparison | 25° C., 60% RH | 0.20 | 95 | 120 |
| Example B4 | 40° C., 80% RH | 0.27 | 67 | 35 |
|  | −5° C. | 0.21 | 20 | 30 |

The sample tapes as examples of the invention have the lubricant containing ester compound made of perfluoropolyether with hydroxyl group at its end and partially fluorined long chain carboxylic acid admixed with long chain hydrocarbon amine. With these sample tapes, the relationship between the added amount of amine and its coefficient of friction is examined.

With respect to the lubricant B1, different amount of amine are added to the ester compound by changing them from 0.01 to 100 mole ratio. The coefficients of friction are measured for these sample tapes. Tables 13 and 14 show the coefficients of friction depending on mole ratio of amine and three different conditions.

TABLE 13

| Amine Molar Ratio | Condition | Coefficient of Friction |
|---|---|---|
| 100 | 25° C., 60% RH | 0.23 |
|  | 40° C., 80% RH | 0.26 |
|  | −5° C. | 0.24 |
| 50 | 25° C., 60% RH | 0.22 |
|  | 40° C., 80% RH | 0.25 |
|  | −5° C. | 0.23 |
| 9 | 25° C., 60% RH | 0.21 |
|  | 40° C., 80% RH | 0.25 |
|  | −5° C. | 0.22 |
| 4 | 25° C., 60% RH | 0.18 |
|  | 40° C., 80% RH | 0.21 |
|  | −5° C. | 0.19 |
| 2.33 | 25° C., 60% RH | 0.17 |
|  | 40° C., 80% RH | 0.20 |
|  | −5° C. | 0.17 |
| 1.5 | 25° C., 60% RH | 0.16 |
|  | 40° C., 80% RH | 0.19 |
|  | −5° C. | 0.16 |
| 1 | 25° C., 60% RH | 0.15 |
|  | 40° C., 80% RH | 0.19 |
|  | −5° C. | 0.15 |

TABLE 14

| Amine Molar Ratio | Condition | Coefficient of Friction |
|---|---|---|
| 0.67 | 25° C., 60% RH | 0.15 |
|  | 40° C., 80% RH | 0.18 |
|  | −5° C. | 0.15 |
| 0.43 | 25° C., 60% RH | 0.15 |
|  | 40° C., 80% RH | 0.18 |
|  | −5° C. | 0.16 |
| 0.25 | 25° C., 60% RH | 0.16 |
|  | 40° C., 80% RH | 0.18 |
|  | −5° C. | 0.16 |
| 0.10 | 25° C., 60% RH | 0.16 |
|  | 40° C., 80% RH | 0.19 |
|  | −5° C. | 0.17 |
| 0.05 | 25° C., 60% RH | 0.17 |
|  | 40° C., 80% RH | 0.20 |
|  | −5° C. | 0.18 |
| 0.02 | 25° C., 60% RH | 0.18 |
|  | 40° C., 80% RH | 0.21 |
|  | −5° C. | 0.18 |
| 0.01 | 25° C., 60% RH | 0.19 |
|  | 40° C., 80% RH | 0.23 |
|  | −5° C. | 0.20 |
| 0 | 25° C., 60% RH | 0.29 |
|  | 40° C., 80% RH | 0.43 |
|  | −5° C. | 0.29 |

Similarly, with respect to the lubricant B11, different amount of amine are added to the ester compound by changing them from 0.01 to 100 mole ratio. The coefficients of friction are measured for these sample tapes. Tables 15 and 16 show the coefficients of friction depending on mole ratio of amine and three different conditions.

TABLE 15

| Amine Molar Ratio | Condition | Coefficient of Friction |
|---|---|---|
| 100 | 25° C., 60% RH | 0.21 |
|  | 40° C., 80% RH | 0.22 |
|  | −5° C. | 0.21 |
| 50 | 25° C., 60% RH | 0.20 |
|  | 40° C., 80% RH | 0.21 |
|  | −5° C. | 0.21 |
| 9 | 25° C., 60% RH | 0.19 |
|  | 40° C., 80% RH | 0.21 |
|  | −5° C. | 0.20 |
| 4 | 25° C., 60% RH | 0.19 |
|  | 40° C., 80% RH | 0.21 |
|  | −5° C. | 0.19 |
| 2.33 | 25° C., 60% RH | 0.18 |
|  | 40° C., 80% RH | 0.21 |
|  | −5° C. | 0.19 |
| 1.5 | 25° C., 60% RH | 0.17 |
|  | 40° C., 80% RH | 0.21 |
|  | −5° C. | 0.18 |
| 1 | 25° C., 60% RH | 0.17 |
|  | 40° C., 80% RH | 0.20 |
|  | −5° C. | 0.17 |

TABLE 16

| Amine Molar Ratio | Condition | Coefficient of Friction |
|---|---|---|
| 0.67 | 25° C., 60% RH | 0.16 |
|  | 40° C., 80% RH | 0.20 |
|  | −5° C. | 0.17 |
| 0.43 | 25° C., 60% RH | 0.17 |
|  | 40° C., 80% RH | 0.20 |
|  | −5° C. | 0.17 |
| 0.25 | 25° C., 60% RH | 0.17 |
|  | 40° C., 80% RH | 0.21 |
|  | −5° C. | 0.18 |
| 0.10 | 25° C., 60% RH | 0.18 |
|  | 40° C., 80% RH | 0.21 |
|  | −5° C. | 0.18 |
| 0.05 | 25° C., 60% RH | 0.19 |

TABLE 16-continued

| Amine Molar Ratio | Condition | Coefficient of Friction |
|---|---|---|
| | 40° C., 80% RH | 0.21 |
| | −5° C. | 0.19 |
| 0.02 | 25° C., 60% RH | 0.19 |
| | 40° C., 80% RH | 0.21 |
| | −5° C. | 0.19 |
| 0.01 | 25° C., 60% RH | 0.19 |
| | 40° C., 80% RH | 0.22 |
| | −5° C. | 0.20 |

The lubricants have been compared between the perfluoropolyether alone with hydroxyl group at its end and the ester compound of perfluoropolyether with hydroxyl group and partially fluorined long chain carboxylic acid admixed with long chain hydrocarbon amine of from 0.01 to 100 mole ratio. It was found that the latter could obtain the better result under various conditions such as friction coefficient, still durability and shuttle durability.

The solubility has been also considered with respect to the ester compound of perfluoropolyether with hydroxyl group at its both ends and partially fluorined long chain carboxylic acid (utilized as the lubricant B1).

The ester compound is soluble in hexane as well as freon. As the long chain hydrocarbon amine is also soluble in hexane, the lubricant B1 is soluble in hexane.

Therefore, the ester compound of perfluoropolyether with hydroxyl group at its end and partially fluorined long chain carboxylic acid admixed with long chain hydrocarbon amine can be utilized as a lubricant with the excellent lubricant effect without using freon.

EXPERIMENTATION C

The lubricant of the third embodiment contains ester compound made of perfluoropolyether having carboxyl group at its end and partially fluorined long chain alcohol admixed with long chain hydrocarbon amine.

The ester compound is composed of perfluoropolyether with carboxyl group at its end and partially fluorined long chain alcohol with p-toluensulfonic acid or concentrated sulfuric acid as a catalyst. The reaction has been completed under reflux and heat in anhydrous toluene by removing the generated water. The solution was then cooled to the room temperature. After removing toluene, it is purified by silica gel column chromatography.

The partially fluorined long chain alcohol can be obtained by the method for example proposed by Brace and others (see, Journal of Organic Chemistry, Vol. 27, pp. 4491). By using chlorination agent such as thionyl chloride, the compound of partially fluorined long chain carboxylic acid can become acid chloride which is thereafter reduced.

The ester compound was thus composed of and thereafter added with long chain hydrocarbon amine so as to become the lubricants C1–C14. The composition and molecular weight of the functional groups $Rf^3$, $R^3$ and R in the general formulas [5] and [10] are described for respective lubricants in the following Table 17.

TABLE 17

| No. | $Rf^2$ | MW | $R^3$ | R |
|---|---|---|---|---|
| C1 | $CF_2(OC_2F_4)_p(OCF_2)_qOCF_2$ | 2000 | $C_8F_{17}C_{10}H_{20}$ | $C_{18}H_{37}$ |
| C2 | $CF_2(OC_2F_4)_p(OCF_2)_qOCF_2$ | 2000 | $C_7F_{15}C_{10}H_{20}$ | $C_{16}H_{33}$ |
| C3 | $CF_2(OC_2F_4)_p(OCF_2)_qOCF_2$ | 2000 | $C_{12}F_{25}C_{10}H_{20}$ | $C_{14}H_{29}$ |
| C4 | $CF_2(OC_2F_4)_p(OCF_2)_qOCF_2$ | 2000 | $C_2F_5C_{10}H_{20}$ | $C_{10}H_{21}$ |
| C5 | $CF_2(OC_2F_4)_p(OCF_2)_qOCF_2$ | 2000 | iso—$C_3F_7C_{10}H_{20}$ | $C_{18}H_{37}$ |
| C6 | $CF_2(OC_2F_4)_p(OCF_2)_qOCF_2$ | 2000 | iso—$C_3F_7C_9H_{18}$ | $C_{18}H_{37}$ |
| C7 | $CF_2(OC_2F_4)_p(OCF_2)_qOCF_2$ | 4000 | $C_{12}F_{25}C_6H_{12}$ | $C_{18}H_{31}$ |
| C8 | $F(CF_2CF_2CF_2O)_nCF_2CF_2$ | 3500 | $C_3F_7CH{=}CHC_8H_{16}$ | $C_{18}H_{37}$ |
| C9 | $F(CF_2CF_2CF_2O)_nCF_2CF_2$ | 3500 | $C_7F_{15}C_{16}H_{32}$ | $C_{18}H_{37}$ |
| C10 | $F(CF_2CF_2CF_2O)_nCF_2CF_2$ | 3500 | $(CF_3)_2CFC_6F_{12}C_{16}H_{32}$ | $C_6H_{11}$ (Cyclo hexyl) |
| C11 | $F(CF_2CF_2CF_2O)_nCF_2CF_2$ | 3500 | $C_8F_{17}C_{10}H_{20}$ | $C_{18}H_{37}C_6H_4$ |
| C12 | $CF_3(OCF(CF_3)CF_2)_m(OCF_2)_1$ | 650 | $C_8F_{17}C_{10}H_{20}$ | iso—$C_{18}H_{37}$ |
| C13 | $CF_3(OCF(CF_3)CF_2)_m(OCF_2)_1$ | 650 | $C_3F_7CH{=}CHC_8H_{16}$ | $C_{18}H_{37}$ |
| C14 | $CF_3(OCF(CF_3)CF_2)_m(OCF_2)_1$ | 650 | $C_7F_{15}C_{16}H_{32}$ | $CH_2{=}CHC_{16}H_{32}$ |

With these lubricants C1 to C14, the sample tapes as examples C1 to C14 are prepared by the same method as explained in the experimentation A. Regarding each sample tape, the friction coefficient, still and shuttle durabilities are measured by the same method as explained in the experimentation A. The results are shown in Tables 18 and 19.

TABLE 18

| | Condition | Coefficient of Friction | Still Durability (Min.) | Shuttle Durability (Times) |
|---|---|---|---|---|
| Example C1 | 25° C., 60% RH | 0.16 | >120 | >150 |
| (Lubricant C1) | 40° C., 80% RH | 0.19 | >120 | >150 |
| | −5° C. | 0.16 | >120 | >150 |
| Example C2 | 25° C., 60% RH | 0.16 | >120 | >150 |
| (Lubricant C2) | 40° C., 80% RH | 0.20 | >120 | >150 |
| | −5° C. | 0.17 | >120 | >150 |
| Example C3 | 25° C., 60% RH | 0.17 | >120 | >150 |
| (Lubricant C3) | 40° C., 80% RH | 0.20 | >120 | >150 |
| | −5° C. | 0.17 | >120 | >150 |
| Example C4 | 25° C., 60% RH | 0.18 | >120 | >150 |
| (Lubricant C4) | 40° C., 80% RH | 0.22 | >120 | >150 |
| | −5° C. | 0.18 | >120 | >150 |
| Example C5 | 25° C., 60% RH | 0.17 | >120 | >150 |
| (Lubricant C5) | 40° C., 80% RH | 0.22 | >120 | >150 |
| | −5° C. | 0.17 | >120 | >150 |

TABLE 18-continued

| | Condition | Coefficient of Friction | Still Durability (Min.) | Shuttle Durability (Times) |
|---|---|---|---|---|
| Example C6 (Lubricant C6) | 25° C., 60% RH | 0.17 | >120 | >150 |
| | 40° C., 80% RH | 0.23 | >120 | >150 |
| | −5° C. | 0.17 | >120 | >150 |
| Example C7 (Lubricant C7) | 25° C., 60% RH | 0.17 | >120 | >150 |
| | 40° C., 80% RH | 0.24 | >120 | >150 |
| | −5° C. | 0.17 | >120 | >150 |

TABLE 19

| | Condition | Coefficient of Friction | Still Durability (Min.) | Shuttle Durability (Times) |
|---|---|---|---|---|
| Example C8 (Lubricant C8) | 25° C., 60% RH | 0.17 | >120 | >150 |
| | 40° C., 80% RH | 0.22 | >120 | >150 |
| | −5° C. | 0.17 | >120 | >150 |
| Example C9 (Lubricant C9) | 25° C., 60% RH | 0.17 | >120 | >150 |
| | 40° C., 80% RH | 0.20 | >120 | >150 |
| | −5° C. | 0.17 | >120 | >150 |
| Example C10 (Lubricant C10) | 25° C., 60% RH | 0.18 | >120 | >150 |
| | 40° C., 80% RH | 0.23 | >120 | >150 |
| | −5° C. | 0.18 | >120 | >150 |
| Example C11 (Lubricant C11) | 25° C., 60% RH | 0.17 | >120 | >150 |
| | 40° C., 80% RH | 0.22 | >120 | >150 |
| | −5° C. | 0.17 | >120 | >150 |
| Example C12 (Lubricant C12) | 25° C., 60% RH | 0.18 | >120 | >150 |
| | 40° C., 80% RH | 0.22 | >120 | >150 |
| | −5° C. | 0.18 | >120 | >150 |
| Example C13 (Lubricant C13) | 25° C., 60% RH | 0.17 | >120 | >150 |
| | 40° C., 80% RH | 0.23 | >120 | >150 |
| | −5° C. | 0.18 | >120 | >150 |
| Example C14 (Lubricant C14) | 25° C., 60% RH | 0.18 | >120 | >150 |
| | 40° C., 80% RH | 0.23 | >120 | >150 |
| | −5° C. | 0.18 | >120 | >150 |

For the purpose of comparison, a sample tape (comparison example C1) is prepared without using any lubricant. The sample tapes (comparison example C2, C3 and C4) are prepared with lubricants made by perfluoropolyether alone having carboxyl group at its end (shown in general formula [20], [21] and [22]). The result of durability measurement is shown in Table 20.

TABLE 20

| | Condition | Coefficient of Friction | Still Durability (Min.) | Shuttle Durability (Times) |
|---|---|---|---|---|
| Comparison Example C1 (without Lubricant) | 25° C., 60% RH | 0.9 | 2 | 3 |
| | 40° C., 80% RH | — | — | — |
| | −5° C. | — | — | — |
| Comparison Example C2 | 25° C., 60% RH | 0.24 | >120 | >150 |
| | 40° C., 80% RH | 0.27 | 91 | 55 |
| | −5° C. | 0.25 | 51 | 60 |
| Comparison Example C3 | 25° C., 60% RH | 0.22 | >120 | 120 |
| | 40° C., 80% RH | 0.23 | 76 | 46 |
| | −5° C. | 0.22 | 29 | 40 |
| Comparison Example C4 | 25° C., 60% RH | 0.24 | 95 | 120 |
| | 40° C., 80% RH | 0.26 | 67 | 35 |
| | −5° C. | 0.25 | 20 | 30 |

The sample tapes as examples of the invention have the lubricant containing ester compound made of perfluoropolyether with carboxyl group at its end and partially fluorined long chain alcohol admixed with long chain hydrocarbon amine. With these sample tapes, the relationship between the added amount of amine and its coefficient of friction is examined.

With respect to the lubricant C1, different amount of amine are added to the ester compound by changing them from 0.01 to 100 mole ratio. The coefficients of friction are measured for these sample tapes. Tables 21 and 22 show the coefficients of friction depending on mole ratio of amine and three different conditions.

TABLE 21

| Amine Molar Ratio | Condition | Coefficient of Friction |
|---|---|---|
| 100 | 25° C., 60% RH | 0.23 |
| | 40° C., 80% RH | 0.26 |
| | −5° C. | 0.24 |
| 50 | 25° C., 60% RH | 0.22 |
| | 40° C., 80% RH | 0.25 |
| | −5° C. | 0.22 |
| 9 | 25° C., 60% RH | 0.21 |
| | 40° C., 80% RH | 0.25 |
| | −5° C. | 0.21 |
| 4 | 25° C., 60% RH | 0.19 |
| | 40° C., 80% RH | 0.23 |
| | −5° C. | 0.19 |
| 2.33 | 25° C., 60% RH | 0.18 |
| | 40° C., 80% RH | 0.22 |
| | −5° C. | 0.18 |

TABLE 21-continued

| Amine Molar Ratio | Condition | Coefficient of Friction |
|---|---|---|
| 1.5 | 25° C., 60% RH | 0.17 |
| | 40° C., 80% RH | 0.21 |
| | −5° C. | 0.17 |
| 1 | 25° C., 60% RH | 0.16 |
| | 40° C., 80% RH | 0.19 |
| | −5° C. | 0.16 |

TABLE 22

| Amine Molar Ratio | Condition | Coefficient of Friction |
|---|---|---|
| 0.67 | 25° C., 60% RH | 0.16 |
| | 40° C., 80% RH | 0.19 |
| | −5° C. | 0.16 |
| 0.43 | 25° C., 60% RH | 0.16 |
| | 40° C., 80% RH | 0.18 |
| | −5° C. | 0.16 |
| 0.25 | 25° C., 60% RH | 0.16 |
| | 40° C., 80% RH | 0.19 |
| | −5° C. | 0.16 |
| 0.10 | 25° C., 60% RH | 0.17 |
| | 40° C., 80% RH | 0.19 |
| | −5° C. | 0.17 |
| 0.05 | 25° C., 60% RH | 0.17 |
| | 40° C., 80% RH | 0.20 |
| | −5° C. | 0.18 |
| 0.02 | 25° C., 60% RH | 0.18 |
| | 40° C., 80% RH | 0.22 |
| | −5° C. | 0.19 |
| 0.01 | 25° C., 60% RH | 0.22 |
| | 40° C., 80% RH | 0.25 |
| | −5° C. | 0.22 |
| 0 | 25° C., 60% RH | 0.24 |
| | 40° C., 80% RH | 0.27 |
| | −5° C. | 0.25 |

Similarly, with respect to the lubricant C11, different amount of amine are added to the ester compound by changing them from 0.01 to 100 mole ratio. The coefficients of friction are measured for these sample tapes. Tables 23 and 24 show the coefficients of friction depending on mole ratio of amine and three different conditions.

TABLE 23

| Amine Molar Ratio | Condition | Coefficient of Friction |
|---|---|---|
| 100 | 25° C., 60% RH | 0.21 |
| | 40° C., 80% RH | 0.23 |
| | −5° C. | 0.21 |
| 50 | 25° C., 60% RH | 0.21 |
| | 40° C., 80% RH | 0.23 |
| | −5° C. | 0.21 |
| 9 | 25° C., 60% RH | 0.20 |
| | 40° C., 80% RH | 0.23 |
| | −5° C. | 0.20 |
| 4 | 25° C., 60% RH | 0.19 |
| | 40° C., 80% RH | 0.23 |
| | −5° C. | 0.19 |
| 2.33 | 25° C., 60% RH | 0.18 |
| | 40° C., 80% RH | 0.23 |
| | −5° C. | 0.19 |
| 1.5 | 25° C., 60% RH | 0.17 |
| | 40° C., 80% RH | 0.23 |
| | −5° C. | 0.18 |
| 1 | 25° C., 60% RH | 0.17 |
| | 40° C., 80% RH | 0.22 |
| | −5° C. | 0.17 |

TABLE 24

| Amine Molar Ratio | Condition | Coefficient of Friction |
|---|---|---|
| 0.67 | 25° C., 60% RH | 0.17 |
| | 40° C., 80% RH | 0.21 |
| | −5° C. | 0.17 |
| 0.43 | 25° C., 60% RH | 0.17 |
| | 40° C., 80% RH | 0.22 |
| | −5° C. | 0.17 |
| 0.25 | 25° C., 60% RH | 0.18 |
| | 40° C., 80% RH | 0.23 |
| | −5° C. | 0.18 |
| 0.10 | 25° C., 60% RH | 0.19 |
| | 40° C., 80% RH | 0.23 |
| | −5° C. | 0.19 |
| 0.05 | 25° C., 60% RH | 0.19 |
| | 40° C., 80% RH | 0.23 |
| | −5° C. | 0.19 |
| 0.02 | 25° C., 60% RH | 0.20 |
| | 40° C., 80% RH | 0.24 |
| | −5° C. | 0.21 |
| 0.01 | 25° C., 60% RH | 0.22 |
| | 40° C., 80% RH | 0.26 |
| | −5° C. | 0.23 |

The lubricants have been compared between the perfluoropolyether alone with carboxyl group at its end and the ester compound of perfluoropolyether with carboxyl group and partially fluorined long chain alcohol admixed with long chain hydrocarbon amine of from 0.01 to 100 mole ratio. It was found that the latter could obtain the better result under various conditions such as friction coefficient, still durability and shuttle durability.

The solubility has been also considered with respect to the ester compound of perfluoropolyether with carboxyl group at its both ends and partially fluorined long chain alcohol (utilized as the lubricant C1).

The ester compound is soluble in hexane as well as freon. As the long chain hydrocarbon amine is also soluble in hexane, the lubricant C1 is soluble in hexane.

Therefore, the ester compound of perfluoropolyether with carboxyl group at its end and partially fluorined long chain alcohol admixed with long chain hydrocarbon amine can be utilized as a lubricant with the excellent lubricant effect without using freon.

EXPERIMENTATION D

The lubricant of the forth embodiment contains ester compound of perfluoropolyether having hydroxyl group at its end and perfluoro carboxylic acid admixed with long chain hydrocarbon amine.

The ester compound is composed of a solution of perfluoropolyether with hydroxyl group at its end and third grade amine added by dropping perfluoro carboxylic acid chloride. The reaction has been completed under reflux and heat after dropping. The solution was then cooled to the room temperature. The generated amine salt is washed by distilled water and then purified by silica gel column chromatography.

The perfluoro carboxylic acid chloride can be obtained by using chlorination agent such as thionyl chloride and catalyst such as dimethylformamide. The perfluoro carboxylic acid can easily become acid chloride.

The ester compound was thus composed of and thereafter added with long chain hydrocarbon amine so as to become the lubricants D1–D14. The composition and molecular weight of the functional groups $Rf^4$, $Rf^5$ and R in the general formulas [14] and [15] are described for respective lubricants in the following Table 25.

TABLE 25

| No. | $R^{f1}$ | MW | $R^2$ | R |
|---|---|---|---|---|
| D1 | $CF_2(OC_2F_4)_p(OCF_2)_qOCF_2$ | 2000 | $C_8F_{17}$ | $C_{18}H_{37}$ |
| D2 | $CF_2(OC_2F_4)_p(OCF_2)_qOCF_2$ | 2000 | $C_7F_{15}$ | $C_{16}H_{33}$ |
| D3 | $CF_2(OC_2F_4)_p(OCF_2)_qOCF_2$ | 2000 | $C_{12}F_{25}$ | $C_{14}H_{29}$ |
| D4 | $CF_2(OC_2F_4)_p(OCF_2)_qOCF_2$ | 2000 | $C_9F_{19}$ | $C_{10}H_{21}$ |
| D5 | $CF_2(OC_2F_4)_p(OCF_2)_qOCF_2$ | 2000 | $C_6F_{13}$ | $C_{18}H_{37}$ |
| D6 | $CF_2(OC_2F_4)_p(OCF_2)_qOCF_2$ | 2000 | $C_9F_{19}$ | $C_{18}H_{37}$ |
| D7 | $CF_2(OC_2F_4)_p(OCF_2)_qOCF_2$ | 4000 | $C_{12}F_{25}$ | $C_{18}H_{31}$ |
| D8 | $F(CF_2CF_2CF_2O)_nCF_2CF_2$ | 3500 | $C_8F_{17}$ | $C_{18}H_{37}$ |
| D9 | $F(CF_2CF_2CF_2O)_nCF_2CF_2$ | 3500 | $C_9F_{19}$ | $C_{18}H_{37}$ |
| D10 | $F(CF_2CF_2CF_2O)_nCF_2CF_2$ | 3500 | $(CF_3)_2CFC_6F_{12}$ | $C_6H_{11}$ (Cyclo hexyl) |
| D11 | $F(CF_2CF_2CF_2O)_nCF_2CF_2$ | 3500 | $C_7F_{15}$ | $C_{18}H_{37}C_6H_4$ |
| D12 | $CF_3(OCF(CF_3)CF_2)_m(OCF_2)_1$ | 650 | $C_8F_{17}$ | iso—$C_{18}H_{37}$ |
| D13 | $CF_3(OCF(CF_3)CF_2)_m(OCF_2)_1$ | 650 | $C_7F_{15}$ | $C_{18}H_{37}$ |
| D14 | $CF_3(OCF(CF_3)CF_2)_m(OCF_2)_1$ | 650 | $C_9F_{19}$ | $CH_2=CHC_{16}H_{32}$ |

With these lubricants D1 to D14, the sample tapes as examples D1 to D14 are prepared by the same method as explained in the experimentation A. Regarding each sample tape, the friction coefficient, still and shuttle durabilities are measured by the same method as explained in the experimentation A. The results are shown in Tables 26 and 27.

TABLE 26

| | Condition | Coefficient of Friction | Still Durability (Min.) | Shuttle Durability (Times) |
|---|---|---|---|---|
| Example D1 | 25° C., 60% RH | 0.17 | >120 | >150 |
| (Lubricant D1) | 40° C., 80% RH | 0.23 | >120 | >150 |
| | −5° C. | 0.17 | >120 | >150 |
| Example D2 | 25° C., 60% RH | 0.17 | >120 | >150 |
| (Lubricant D2) | 40° C., 80% RH | 0.23 | >120 | >150 |
| | −5° C. | 0.18 | >120 | >150 |
| Example D3 | 25° C., 60% RH | 0.18 | >120 | >150 |
| (Lubricant D3) | 40° C., 80% RH | 0.23 | >120 | >150 |
| | −5° C. | 0.18 | >120 | >150 |
| Example D4 | 25° C., 60% RH | 0.18 | >120 | >150 |
| (Lubricant D4) | 40° C., 80% RH | 0.23 | >120 | >150 |
| | −5° C. | 0.18 | >120 | >150 |
| Example D5 | 25° C., 60% RH | 0.17 | >120 | >150 |
| (Lubricant D5) | 40° C., 80% RH | 0.22 | >120 | >150 |
| | −5° C. | 0.17 | >120 | >150 |
| Example D6 | 25° C., 60% RH | 0.16 | >120 | >150 |
| (Lubricant D6) | 40° C., 80% RH | 0.22 | >120 | >150 |
| | −5° C. | 0.17 | >120 | >150 |
| Example D7 | 25° C., 60% RH | 0.17 | >120 | >150 |
| (Lubricant D7) | 40° C., 80% RH | 0.23 | >120 | >150 |
| | −5° C. | 0.18 | >120 | >150 |

TABLE 27

| | Condition | Coefficient of Friction | Still Durability (Min.) | Shuttle Durability (Times) |
|---|---|---|---|---|
| Example D8 | 25° C., 60% RH | 0.17 | >120 | >150 |
| (Lubricant D8) | 40° C., 80% RH | 0.22 | >120 | >150 |
| | −5° C. | 0.17 | >120 | >150 |
| Example D9 | 25° C., 60% RH | 0.17 | >120 | >150 |
| (Lubricant D9) | 40° C., 80% RH | 0.22 | >120 | >150 |
| | −5° C. | 0.17 | >120 | >150 |
| Example D10 | 25° C., 60% RH | 0.19 | >120 | >150 |
| (Lubricant D10) | 40° C., 80% RH | 0.24 | >120 | >150 |
| | −5° C. | 0.20 | >120 | >150 |
| Example D11 | 25° C., 60% RH | 0.17 | >120 | >150 |
| (Lubricant D11) | 40° C., 80% RH | 0.22 | >120 | >150 |
| | −5° C. | 0.17 | >120 | >150 |
| Example D12 | 25° C., 60% RH | 0.19 | >120 | >150 |
| (Lubricant D12) | 40° C., 80% RH | 0.24 | >120 | >150 |
| | −5° C. | 0.19 | >120 | >150 |
| Example D13 | 25° C., 60% RH | 0.17 | >120 | >150 |
| (Lubricant D13) | 40° C., 80% RH | 0.22 | >120 | >150 |
| | −5° C. | 0.18 | >120 | >150 |
| Example D14 | 25° C., 60% RH | 0.18 | >120 | >150 |
| (Lubricant D14) | 40° C., 80% RH | 0.23 | >120 | >150 |
| | −5° C. | 0.19 | >120 | >150 |

For the purpose of comparison, a sample tape (comparison example D1) is prepared without using any lubricant. The sample tapes (comparison example D2, D3 and D4) are prepared with lubricants made by perfluoropolyether alone having hydroxyl group at its end (shown in general formula [17], [18] and [19]). The result of durability measurement is shown in Table 28.

TABLE 28

|  | Condition | Coefficient of Friction | Still Durability (Min.) | Shuttle Durability (Times) |
|---|---|---|---|---|
| Comparison Example D1 (without Lubricant) | 25° C., 60% RH | 0.9 | 2 | 3 |
|  | 40° C., 80% RH | — | — | — |
|  | −5° C. | — | — | — |
| Comparison Example D2 | 25° C., 60% RH | 0.20 | >120 | >150 |
|  | 40° C., 80% RH | 0.30 | 91 | 55 |
|  | −5° C. | 0.21 | 51 | 60 |
| Comparison Example D3 | 25° C., 60% RH | 0.24 | >120 | 120 |
|  | 40° C., 80% RH | 0.32 | 76 | 46 |
|  | −5° C. | 0.25 | 29 | 40 |
| Comparison Example D4 | 25° C., 60% RH | 0.20 | 95 | 120 |
|  | 40° C., 80% RH | 0.27 | 67 | 35 |
|  | −5° C. | 0.21 | 20 | 30 |

The sample tapes as examples of the invention have the lubricant containing ester compound made of perfluoropolyether admixed with long chain hydrocarbon amine. With these sample tapes, the relationship between the added amount of amine and its coefficient of friction is examined.

With respect to the lubricant D1, different amount of amine are added to the ester compound by changing them from 0.01 to 100 mole ratio. The coefficients of friction are measured for these sample tapes. Tables 29 and 30 show the coefficients of friction depending on mole ratio of amine and three different conditions.

TABLE 29

| Amine Molar Ratio | Condition | Coefficient of Friction |
|---|---|---|
| 100 | 25° C., 60% RH | 0.24 |
|  | 40° C., 80% RH | 0.26 |
|  | −5° C. | 0.24 |
| 50 | 25° C., 60% RH | 0.22 |
|  | 40° C., 80% RH | 0.25 |
|  | −5° C. | 0.23 |
| 9 | 25° C., 60% RH | 0.21 |
|  | 40° C., 80% RH | 0.25 |
|  | −5° C. | 0.22 |
| 4 | 25° C., 60% RH | 0.18 |
|  | 40° C., 80% RH | 0.24 |
|  | −5° C. | 0.19 |
| 2.33 | 25° C., 60% RH | 0.18 |
|  | 40° C., 80% RH | 0.23 |
|  | −5° C. | 0.18 |
| 1.5 | 25° C., 60% RH | 0.17 |
|  | 40° C., 80% RH | 0.23 |
|  | −5° C. | 0.17 |
| 1 | 25° C., 60% RH | 0.16 |
|  | 40° C., 80% RH | 0.22 |
|  | −5° C. | 0.17 |

TABLE 30

| Amine Molar Ratio | Condition | Coefficient of Friction |
|---|---|---|
| 0.67 | 25° C., 60% RH | 0.16 |
|  | 40° C., 80% RH | 0.22 |
|  | −5° C. | 0.17 |
| 0.43 | 25° C., 60% RH | 0.17 |
|  | 40° C., 80% RH | 0.23 |
|  | −5° C. | 0.18 |
| 0.25 | 25° C., 60% RH | 0.17 |
|  | 40° C., 80% RH | 0.23 |
|  | −5° C. | 0.18 |
| 0.10 | 25° C., 60% RH | 0.19 |
|  | 40° C., 80% RH | 0.23 |
|  | −5° C. | 0.19 |
| 0.05 | 25° C., 60% RH | 0.19 |
|  | 40° C., 80% RH | 0.24 |
|  | −5° C. | 0.21 |
| 0.02 | 25° C., 60% RH | 0.20 |
|  | 40° C., 80% RH | 0.25 |
|  | −5° C. | 0.21 |
| 0.01 | 25° C., 60% RH | 0.21 |
|  | 40° C., 80% RH | 0.26 |
|  | −5° C. | 0.22 |
| 0 | 25° C., 60% RH | 0.24 |
|  | 40° C., 80% RH | 0.27 |
|  | −5° C. | 0.25 |

Similarly, with respect to the lubricant D11, different amount of amine are added to the ester compound by changing them from 0.01 to 100 mole ratio. The coefficients of friction are measured for these sample tapes. Tables 31 and 32 show the coefficients of friction depending on mole ratio of amine and three different conditions.

TABLE 31

| Amine Molar Ratio | Condition | Coefficient of Friction |
|---|---|---|
| 100 | 25° C., 60% RH | 0.22 |
|  | 40° C., 80% RH | 0.26 |
|  | −5° C. | 0.21 |
| 50 | 25° C., 60% RH | 0.21 |
|  | 40° C., 80% RH | 0.25 |
|  | −5° C. | 0.21 |
| 9 | 25° C., 60% RH | 0.19 |
|  | 40° C., 80% RH | 0.21 |
|  | −5° C. | 0.20 |
| 4 | 25° C., 60% RH | 0.19 |
|  | 40° C., 80% RH | 0.21 |
|  | −5° C. | 0.19 |
| 2.33 | 25° C., 60% RH | 0.18 |
|  | 40° C., 80% RH | 0.21 |
|  | −5° C. | 0.19 |
| 1.5 | 25° C., 60% RH | 0.17 |
|  | 40° C., 80% RH | 0.23 |
|  | −5° C. | 0.18 |
| 1 | 25° C., 60% RH | 0.17 |
|  | 40° C., 80% RH | 0.22 |
|  | −5° C. | 0.17 |

TABLE 32

| Amine Molar Ratio | Condition | Coefficient of Friction |
|---|---|---|
| 0.67 | 25° C., 60% RH | 0.16 |
|  | 40° C., 80% RH | 0.22 |
|  | −5° C. | 0.17 |
| 0.43 | 25° C., 60% RH | 0.17 |
|  | 40° C., 80% RH | 0.23 |

TABLE 32-continued

| Amine Molar Ratio | Condition | Coefficient of Friction |
|---|---|---|
| | −5° C. | 0.17 |
| 0.25 | 25° C., 60% RH | 0.17 |
| | 40° C., 80% RH | 0.24 |
| | −5° C. | 0.18 |
| 0.10 | 25° C., 60% RH | 0.18 |
| | 40° C., 80% RH | 0.25 |
| | −5° C. | 0.18 |
| 0.05 | 25° C., 60% RH | 0.19 |
| | 40° C., 80% RH | 0.25 |
| | −5° C. | 0.19 |
| 0.02 | 25° C., 60% RH | 0.19 |
| | 40° C., 80% RH | 0.25 |
| | −5° C. | 0.19 |
| 0.01 | 25° C., 60% RH | 0.19 |
| | 40° C., 80% RH | 0.25 |
| | −5° C. | 0.20 |

The lubricants have been compared between the perfluoropolyether alone with hydroxyl group at its end and the ester compound of perfluoropolyether with hydroxyl group and perfluoro carboxylic acid admixed with long chain hydrocarbon amine of from 0.01 to 100 mole ratio. It was found that the latter could obtain the better result under various conditions such as friction coefficient, still durability and shuttle durability.

The solubility has been also considered with respect to the ester compound of perfluoropolyether with hydroxyl group at its end and perfluoro carboxylic acid (utilized as the lubricant D1).

The ester compound is soluble in hexane as well as freon. As the long chain alkyl amine is also soluble in hexane, the lubricant D1 is soluble in hexane.

Therefore, the ester compound of perfluoropolyether with hydroxyl group at its end and perfluoro carboxylic acid admixed with long chain hydrocarbon amine can be utilized as a lubricant with the excellent lubricant effect without using freon.

EXPERIMENTATION E

The lubricant of the fifth embodiment contains ester compound made of perfluoropolyether having hydroxyl group at its end and long chain carboxylic acid admixed with long chain hydrocarbon amine. The ester compound is further admixed by at least selected one of phosphoric ester, phosphorous ester and carboxylate ester. The lubricant of the sixth embodiment contains ester compound made of perfluoropolyether having carboxyl group at its end and long chain alcohol admixed with long chain hydrocarbon amine. The ester compound is further admixed by at least selected one of phosphoric ester, phosphorous ester and carboxylate ester.

The ester compound of perfluoropolyether having hydroxyl group at its end and long chain carboxylic acid (shown by the general formula [11]) is composed of a solution of perfluoropolyether with hydroxyl group at its end and third grade amine added by dropping long chain carboxylic acid chloride. The reaction has been completed under reflux and heat after dropping. The solution was then cooled to the room temperature. The generated amine salt was washed by distilled water and then purified by silica gel column chromatography.

The ester compound of perfluoropolyether having carboxyl group at its end and long chain alcohol (shown by the general formula [16]) is performed in anhydrous toluene by removing water out of the perfluoropolyether having carboxyl group at its end and the long chain alcohol. After having the reaction completed, toluene is removed and it is purified by silica gel column chromatography.

The ester compound shown by the general formula [11] is more in detail by the formula [23]. The lubricants E1 to E14 are shown by the formula [23A] with molecular weight of 2000 and two functional or shown by the formula [23B] with molecular weight of 2000 and monofunctional. Table 33 shows respective examples of alkyl group R, phosphorus group extreme pressure agent and long chain carboxylic acid ester as the long chain hydrocarbon amine.

$C_{17}H_{35}COOCH_2CF_2(OC_2F_4)_p(OCF_2)_qOCF_2CH_2OCOC_{17}H_{35}$     formula [23A]

$F(CF_2CF_2CF_2O)_nCF_2CF_2CH_2OCOC_{17}H_{35}$     formula [23B]

TABLE 33

| No. | Ester | R | Phosphorus Group Extreme Pressure Agent | Long Chain Carboxylic Acid Ester |
|---|---|---|---|---|
| E1 | (a) | $C_{18}H_{37}$ | $(C_{18}H_{37}O)_3P$ | $C_{17}F_{35}COOC_2H_5$ |
| E2 | (a) | $C_{16}H_{33}$ | $(C_{16}H_{33}O)_3P$ | $C_{15}F_{31}COOC_2H_5$ |
| E3 | (a) | $C_{14}H_{29}$ | $(C_{14}H_{29}O)_3P$ | $C_{11}F_{23}COOC_2H_5$ |
| E4 | (a) | $C_{10}H_{21}$ | $C_{12}H_{25}OP(OH)_2$ | $C_{17}F_{31}COOC_2H_5$ |
| E5 | (a) | $C_{18}H_{37}$ | $(C_{12}H_{25}O)_2POH$ | $C_{17}F_{29}COOC_2H_5$ |
| E6 | (a) | $C_{18}H_{37}$ | $(C_{12}H_{25}S)_3P$ | $C_{17}F_{29}COOCH_2C_7F_{15}$ |
| E7 | (a) | $C_{18}H_{31}$ | $(C_{18}H_{31}S)_3P=O$ | iso—$C_{17}H_{35}COOC_2H_5$ |
| E8 | (a) | $C_{18}H_{37}$ | $(C_{12}H_{25}S)_3P=S$ | $C_9F_{19}COOC_{18}H_{37}$ |
| E9 | (b) | $C_{18}H_{37}$ | $(C_{12}H_{25}O)_2POOH$ | $C_9H_{19}COOC_2H_5$ |
| E10 | (b) | $C_6H_{11}$ (Cyclo hexyl) | $(C_6H_{11}O)_3P$ | $C_{17}H_{35}COOC_6H_{11}$ |
| E11 | (b) | $C_{18}H_{37}C_6H_4$ | $(C_{18}H_{37}C_6H_4O)_3P$ | $C_{17}H_{35}COOC_2H_5$ |
| E12 | (b) | iso—$C_{18}H_{37}$ | (iso—$C_{18}H_{37}O)_3P$ | $C_{17}H_{35}COOC_2H_5$ |
| E13 | (b) | $C_{18}H_{37}$ | $(C_{18}H_{37}O)_3P$ | $C_{17}H_{35}COOC_2H_5$ |
| E14 | (b) | $CH_2=CHC_{16}H_{32}$ | $(C_{18}H_{37}O)_3P$ | $C_{17}H_{35}COOC_2H_5$ |

The ester compound shown by the general formula [16] is more in detail by the formula [24]. The lubricants E15 to E28 are shown by the formula [23C] with molecular weight of 2 000 and two functional or shown by the formula [23D] with molecular weight of 2000 and monofunctional, Table 34 shows respective examples of alkyl group R, phosphorus group extreme pressure agent and long chain carboxylic acid ester as the long chain hydrocarbon amine, $C_{18}H_{37}OCOCF_2(OC_2F_4)_p(OCF_2)_qOCF_2COOC_{18}H_{37}$     formula [23C]

$F(CF_2CF_2CF_2O)_nCF_2CF_2COOC_{18}H_{37}$     formula [23D]

TABLE 34

| No. | Ester | R | Phosphorus Group Extreme Pressure Agent | Long Chain Carboxylic Acid Ester |
|---|---|---|---|---|
| E15 | (c) | $C_{18}H_{37}$ | $(C_{18}H_{37}O)_3P$ | $C_{17}F_{35}COOC_2H_5$ |
| E16 | (c) | $C_{16}H_{33}$ | $(C_{16}H_{33}O)_3P$ | $C_{15}F_{31}COOC_2H_5$ |
| E17 | (c) | $C_{14}H_{29}$ | $(C_{14}H_{29}O)_3P$ | $C_{11}F_{23}COOC_2H_5$ |
| E18 | (c) | $C_{10}H_{21}$ | $C_{12}H_{25}OP(OH)_2$ | $C_{17}F_{31}COOC_2H_5$ |
| E19 | (c) | $C_{18}H_{37}$ | $(C_{12}H_{25}O)_2POH$ | $C_{17}F_{29}COOC_2H_5$ |
| E20 | (c) | $C_{18}H_{31}$ | $(C_{12}H_{25}S)_3P$ | $C_{17}F_{29}COOCH_2C_7F_{15}$ |
| E21 | (c) | $C_{18}H_{37}$ | $(C_{18}H_{31}S)_3P=O$ | iso—$C_{17}H_{35}COOC_2H_5$ |
| E22 | (c) | $C_{18}H_{37}$ | $(C_{12}H_{25}S)_3P=S$ | $C_9F_{19}COOC_{18}H_{37}$ |
| E23 | (d) | $C_{18}H_{37}$ | $(C_{12}H_{25}O)_2POOH$ | $C_9H_{19}COOC_2H_5$ |
| E24 | (d) | $C_6H_{11}$ (Cyclo hexyl) | $(C_6H_{11}O)_3P$ | $C_{17}H_{35}COOC_6H_{11}$ |
| E25 | (d) | $C_{18}H_{37}C_6H_4$ | $(C_{18}H_{37}C_6H_4O)_3P$ | $C_{17}H_{35}COOC_2H_5$ |
| E26 | (d) | iso—$C_{18}H_{37}$ | (iso—$C_{18}H_{37}O)_3P$ | $C_{17}H_{35}COOC_2H_5$ |
| E27 | (d) | $C_{18}H_{37}$ | $(C_{18}H_{37}O)_3P$ | $C_{17}H_{35}COOC_2H_5$ |
| E28 | (d) | $CH_2=CHC_{16}H_{32}$ | $(C_{18}H_{37}O)_3P$ | $C_{17}H_{35}COOC_4H_9$ |

With these lubricants E1 to E28, the sample tapes are prepared by the same method as explained in the experimentation A. Regarding each sample tape, the friction coefficient, still and shuttle durabilities are measured by the same method as explained in the experimentation A.

The results are shown in Tables 35 and 36 for the examples E1 to 14 with the lubricants E1 to E14 and also in Tables 37 and 38 for the examples E15 to 28 with the lubricants E15 to E28.

TABLE 35

| | Condition | Coefficient of Friction | Still Durability (Min.) | Shuttle Durability (Times) |
|---|---|---|---|---|
| Example E1 (Lubricant E1) | 25° C., 60% RH | 0.16 | >150 | >150 |
| | 40° C., 80% RH | 0.19 | >150 | >150 |
| | −5° C. | 0.16 | >150 | >150 |
| Example E2 (Lubricant E2) | 25° C., 60% RH | 0.16 | >150 | >150 |
| | 40° C., 80% RH | 0.20 | >150 | >150 |
| | −5° C. | 0.17 | >150 | >150 |
| Example E3 (Lubricant E3) | 25° C., 60% RH | 0.16 | >150 | >150 |
| | 40° C., 80% RH | 0.21 | >150 | >150 |
| | −5° C. | 0.17 | >150 | >150 |
| Example E4 (Lubricant E4) | 25° C., 60% RH | 0.16 | >150 | >150 |
| | 40° C., 80% RH | 0.19 | >150 | >150 |
| | −5° C. | 0.16 | >150 | >150 |
| Example E5 (Lubricant E5) | 25° C., 60% RH | 0.16 | >150 | >150 |
| | 40° C., 80% RH | 0.19 | >150 | >150 |
| | −5° C. | 0.17 | >150 | >150 |
| Example E6 (Lubricant E6) | 25° C., 60% RH | 0.16 | >150 | >150 |
| | 40° C., 80% RH | 0.19 | >150 | >150 |
| | −5° C. | 0.17 | >150 | >150 |
| Example E7 (Lubricant E7) | 25° C., 60% RH | 0.17 | >150 | >150 |
| | 40° C., 80% RH | 0.20 | >150 | >150 |
| | −5° C. | 0.17 | >150 | >150 |

TABLE 36

| | Condition | Coefficient of Friction | Still Durability (Min.) | Shuttle Durability (Times) |
|---|---|---|---|---|
| Example E8 (Lubricant E8) | 25° C., 60% RH | 0.17 | >150 | >150 |
| | 40° C., 80% RH | 0.22 | >150 | >150 |
| | −5° C. | 0.18 | >150 | >150 |
| Example E9 (Lubricant E9) | 25° C., 60% RH | 0.18 | >150 | >150 |
| | 40° C., 80% RH | 0.22 | >150 | >150 |
| | −5° C. | 0.19 | >150 | >150 |
| Example E10 (Lubricant E10) | 25° C., 60% RH | 0.19 | >150 | >150 |
| | 40° C., 80% RH | 0.23 | >150 | >150 |
| | −5° C. | 0.20 | >150 | >150 |
| Example E11 (Lubricant E11) | 25° C., 60% RH | 0.16 | >150 | >150 |
| | 40° C., 80% RH | 0.20 | >150 | >150 |
| | −5° C. | 0.17 | >150 | >150 |
| Example E12 (Lubricant E12) | 25° C., 60% RH | 0.18 | >150 | >150 |
| | 40° C., 80% RH | 0.22 | >150 | >150 |
| | −5° C. | 0.19 | >150 | >150 |
| Example E13 (Lubricant E13) | 25° C., 60% RH | 0.16 | >150 | >150 |
| | 40° C., 80% RH | 0.19 | >150 | >150 |
| | −5° C. | 0.17 | >150 | >150 |
| Example E14 (Lubricant E14) | 25° C., 60% RH | 0.17 | >150 | >150 |
| | 40° C., 80% RH | 0.20 | >150 | >150 |

TABLE 36-continued

| | Condition | Coefficient of Friction | Still Durability (Min.) | Shuttle Durability (Times) |
|---|---|---|---|---|
| | −5° C. | 0.18 | >150 | >150 |

TABLE 37

| | Condition | Coefficient of Friction | Still Durability (Min.) | Shuttle Durability (Times) |
|---|---|---|---|---|
| Example E15 | 25° C., 60% RH | 0.15 | >150 | >150 |
| (Lubricant E15) | 40° C., 80% RH | 0.19 | >150 | >150 |
| | −5° C. | 0.16 | >150 | >150 |
| Example E16 | 25° C., 60% RH | 0.16 | >150 | >150 |
| (Lubricant E16) | 40° C., 80% RH | 0.20 | >150 | >150 |
| | −5° C. | 0.17 | >150 | >150 |
| Example E17 | 25° C., 60% RH | 0.16 | >150 | >150 |
| (Lubricant E17) | 40° C., 80% RH | 0.22 | >150 | >150 |
| | −5° C. | 0.17 | >150 | >150 |
| Example E18 | 25° C., 60% RH | 0.16 | >150 | >150 |
| (Lubricant E18) | 40° C., 80% RH | 0.19 | >150 | >150 |
| | −5° C. | 0.17 | >150 | >150 |
| Example E19 | 25° C., 60% RH | 0.16 | >150 | >150 |
| (Lubricant E19) | 40° C., 80% RH | 0.21 | >150 | >150 |
| | −5° C. | 0.17 | >150 | >150 |
| Example E20 | 25° C., 60% RH | 0.17 | >150 | >150 |
| (Lubricant E20) | 40° C., 80% RH | 0.20 | >150 | >150 |
| | −5° C. | 0.18 | >150 | >150 |
| Example E21 | 25° C., 60% RH | 0.18 | >150 | >150 |
| (Lubricant E21) | 40° C., 80% RH | 0.20 | >150 | >150 |
| | −5° C. | 0.18 | >150 | >150 |

TABLE 38

| | Condition | Coefficient of Friction | Still Durability (Min.) | Shuttle Durability (Times) |
|---|---|---|---|---|
| Example E22 | 25° C., 60% RH | 0.17 | >150 | >150 |
| (Lubricant E22) | 40° C., 80% RH | 0.20 | >150 | >150 |
| | −5° C. | 0.18 | >150 | >150 |
| Example E23 | 25° C., 60% RH | 0.19 | >150 | >150 |
| (Lubricant E23) | 40° C., 80% RH | 0.23 | >150 | >150 |
| | −5° C. | 0.19 | >150 | >150 |
| Example E24 | 25° C., 60% RH | 0.19 | >150 | >150 |
| (Lubricant E24) | 40° C., 80% RH | 0.24 | >150 | >150 |
| | −5° C. | 0.19 | >150 | >150 |
| Example E25 | 25° C., 60% RH | 0.16 | >150 | >150 |
| (Lubricant E25) | 40° C., 80% RH | 0.19 | >150 | >150 |
| | −5° C. | 0.17 | >150 | >150 |
| Example E26 | 25° C., 60% RH | 0.18 | >150 | >150 |
| (Lubricant E26) | 40° C., 80% RH | 0.23 | >150 | >150 |
| | −5° C. | 0.18 | >150 | >150 |
| Example E27 | 25° C., 60% RH | 0.17 | >150 | >150 |
| (Lubricant E27) | 40° C., 80% RH | 0.20 | >150 | >150 |
| | −5° C. | 0.18 | >150 | >150 |
| Example E28 | 25° C., 60% RH | 0.17 | >150 | >150 |
| (Lubricant E28) | 40° C., 80% RH | 0.22 | >150 | >150 |
| | −5° C. | 0.18 | >150 | >150 |

For the purpose of comparison, a sample tape (comparison example E1) is prepared without using any lubricant. The sample tapes (comparison example E2 and E3) are prepared with lubricants made by perfluoropolyether alone having hydroxyl group at its end (shown in general formula [17] and [18]). The sample tapes (comparison example E4 and E5) are prepared with lubricants made by perfluoropolyether alone having carboxyl group at its end (shown in general formula [20] and [21]). The result of durability measurement is shown in Table 39.

TABLE 39

| | Condition | Coefficient of Friction | Still Durability (Min.) | Shuttle Durability (Times) |
|---|---|---|---|---|
| Comparison Example E1 (without Lubricant) | 25° C., 60% RH | 0.9 | 2 | 3 |
| | 40° C., 80% RH | — | — | — |
| | −5° C. | — | — | — |
| Comparison Example E2 | 25° C., 60% RH | 0.20 | >120 | >150 |
| | 40° C., 80% RH | 0.30 | 91 | 55 |

TABLE 39-continued

|  | Condition | Coefficient of Friction | Still Durability (Min.) | Shuttle Durability (Times) |
|---|---|---|---|---|
|  | −5° C. | 0.21 | 51 | 60 |
| Comparison Example E3 | 25° C., 60% RH | 0.24 | >120 | 120 |
|  | 40° C., 80% RH | 0.27 | 76 | 46 |
|  | −5° C. | 0.25 | 29 | 40 |
| Comparison Example E4 | 25° C., 60% RH | 0.24 | >120 | >150 |
|  | 40° C., 80% RH | 0.27 | 91 | 55 |
|  | −5° C. | 0.25 | 51 | 60 |
| Comparison Example E5 | 25° C., 60% RH | 0.22 | >120 | 120 |
|  | 40° C., 80% RH | 0.23 | 76 | 46 |
|  | −5° C. | 0.22 | 29 | 40 |

The sample tapes as examples of the invention have the lubricant containing ester compound made of perfluoropolyether admixed with long chain hydrocarbon amine. With these sample tapes, the relationship between the added amount of amine and its coefficient of friction is examined.

With respect to the lubricant E1, different amount of stearic amine are added to the ester compound by changing them from 0.01 to 100 mole ratio. The coefficients of friction are measured for these sample tapes. As the phosphoric ester, $(C_{12}H_{25}O)_3P$ is utilized and as the long chain carboxylic acid, $C_{17}H_{35}COOC_4H_9$ is utilized. Tables 40 and 41 show the coefficients of friction depending on mole ratio of amine and three different conditions.

TABLE 40

| Amine Molar Ratio | Condition | Coefficient of Friction |
|---|---|---|
| 100 | 25° C., 60% RH | 0.24 |
|  | 40° C., 80% RH | 0.28 |
|  | −5° C. | 0.24 |
| 50 | 25° C., 60% RH | 0.23 |
|  | 40° C., 80% RH | 0.26 |
|  | −5° C. | 0.23 |
| 9 | 25° C., 60% RH | 0.22 |
|  | 40° C., 80% RH | 0.25 |
|  | −5° C. | 0.22 |
| 4 | 25° C., 60% RH | 0.20 |
|  | 40° C., 80% RH | 0.25 |
|  | −5° C. | 0.21 |
| 2.33 | 25° C., 60% RH | 0.18 |
|  | 40° C., 80% RH | 0.23 |
|  | −5° C. | 0.18 |
| 1.5 | 25° C., 60% RH | 0.17 |
|  | 40° C., 80% RH | 0.21 |
|  | −5° C. | 0.17 |
| 1 | 25° C., 60% RH | 0.16 |
|  | 40° C., 80% RH | 0.19 |
|  | −5° C. | 0.16 |

TABLE 41

| Amine Molar Ratio | Condition | Coefficient of Friction |
|---|---|---|
| 0.67 | 25° C., 60% RH | 0.16 |
|  | 40° C., 80% RH | 0.20 |
|  | −5° C. | 0.16 |
| 0.43 | 25° C., 60% RH | 0.17 |
|  | 40° C., 80% RH | 0.21 |
|  | −5° C. | 0.17 |
| 0.25 | 25° C., 60% RH | 0.17 |
|  | 40° C., 80% RH | 0.22 |
|  | −5° C. | 0.17 |
| 0.10 | 25° C., 60% RH | 0.17 |
|  | 40° C., 80% RH | 0.22 |
|  | −5° C. | 0.17 |
| 0.05 | 25° C., 60% RH | 0.19 |
|  | 40° C., 80% RH | 0.24 |
|  | −5° C. | 0.19 |
| 0.02 | 25° C., 60% RH | 0.21 |
|  | 40° C., 80% RH | 0.25 |
|  | −5° C. | 0.21 |
| 0.01 | 25° C., 60% RH | 0.23 |
|  | 40° C., 80% RH | 0.27 |
|  | −5° C. | 0.23 |
| 0 | 25° C., 60% RH | 0.29 |
|  | 40° C., 80% RH | 0.43 |
|  | −5° C. | 0.29 |

Regarding the above lubricant, when it has the amount of amine of zero mole ratio, in other words no amine is admixed, the following data has obtained by the still and shuttle durabilities measurement.

25° C., 60% RH: still durability: 57 mins.; shuttle durability: 63 mins.

40° C., 80% RH: still durability: 23 mins.; shuttle durability: 31 mins.

−5° C.: still durability: 32 mins.; shuttle durability: 33 mins.

These data show relatively unsatisfactory values.

The lubricants have been compared between the perfluoropolyether alone with hydroxyl group or carboxyl group at its end and the ester compound admixed with long chain hydrocarbon amine of from 0.01 to 100 mole ratio, further admixed with phosphoric ester, phosphorous ester or long chain carboxylate ester. It was found that the latter could obtain the better result under various conditions such as friction coefficient, still durability and shuttle durability.

The solubility has been also considered with respect to the ester compound of perfluoropolyether with hydroxyl group at its end and long chain carboxylate acid and the ester compound of perfluoropolyether with carboxyl group at its end and long chain alcohol. The ester compound are soluble in hexane as well as freon. As the long chain hydrocarbon amine, phosphoric ester, phosphorous ester and long chain carboxylate ester etc. are also soluble in hexane, the above lubricant is soluble in hexane.

Therefore, the ester compound of perfluoropolyether with hydroxyl group at its end and long chain carboxylate acid or the ester compound of perfluoropolyether with carboxyl group at its end and long chain alcohol admixed with long chain hydrocarbon amine, phosphoric ester, phosphorous ester and long chain carboxylate ester etc. can be utilized as a lubricant with the excellent lubricant effect without using freon.

As clearly understood by the above explanation, the lubricant is made of the ester compound of perfluoropolyether and long chain alcohol admixed by long chain hydrocarbon amine of from 0.01 to 100 mole ratio. The lubricant has excellent lubricant effect and maintain the effect for a long time under any conditions.

By esterifying perfluoropolyether, The solubility can be improved and it becomes unnecessary to use freon as a diluent.

The magnetic recording medium with these lubricant therefore has the same lubricant effect at the surface of the medium for a long time under any conditions. The magnetic recording medium can have excellent wear characteristics, durability and in particular outstanding running characteristics.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A lubricant comprising:
   an ester compound including a perfluoropolyether with an hydroxyl group at its end and a long chain carboxylic acid, and
   a long chain hydrocarbon amine, wherein said ester compound is represented by a formula chosen from the group consisting of:

$R^{f1}-CH_2OCOR^1$;

and $R^1COOCH_2R^{f1}CH_2OCOR^1$ wherein $R^{f1}$ is a perfluoropolyether group and $R^1$ is a long chain hydrocarbon group; and said long chain hydrocarbon amine is represented by the formula:

$RNH_2$ in which R is a long chain hydrocarbon group.

2. A magnetic recording medium comprising a magnetic layer on non-magnetic base member and the lubricant in accordance with claim 1 on the surface of said magnetic layer.

3. A lubricant comprising:
   an ester compound including a perfluoropolyether with a hydroxyl group at its end and a partially fluorined long chain carboxylic acid, and
   a long chain hydrocarbon amine, wherein said ester compound is represented by a formula chosen from the group consisting of:

$R^{f2}-CH_2OCOR^2$;

and $R^2COOCH_2R^{f2}CH_2OCOR^2$ wherein $Rf^2$ is a perfluoropolyether group and $R^2$ is a partially fluorined long chain hydrocarbon group; and said long chain hydrocarbon amine is represented by the formula:

$RNH_2$ in which R is a long chain hydrocarbon group.

4. A magnetic recording medium comprising a magnetic layer on non-magnetic base member and the lubricant in accordance with claim 3 on the surface of said magnetic layer.

5. A lubricant comprising:
   an ester compound including a perfluoropolyether with a carboxyl group at its end and a partially fluorined long chain alcohol, and
   long chain hydrocarbon amine, wherein said ester compound is represented by a formula chosen from the group consisting of:

$R^{f3}-COOR^3$;

and $R^aOCOR^{f3}COOR^3$ wherein $R^{f3}$ is a perfluoropolyether group and $R^3$ is a partially fluorined long chain hydrocarbon group; and said long chain hydrocarbon amine is represented by the formula:

$RNH_2$ in which R is a long chain group hydrocarbon.

6. A magnetic recording medium comprising a magnetic layer on non-magnetic base member and the lubricant in accordance with claim 5 on the surface of said magnetic layer.

7. A lubricant comprising:
   an ester compound including a perfluoropolyether with a hydroxyl group at its end and a perfluoro carboxylic acid, and
   a long chain hydrocarbon amine, wherein said ester compound is represented by a formula chosen from the group consisting of:

$R^{f4}-CH_2OCOR^{f5}$;

and $R^{f5}COOCH_2R^{f4}CH_2OCOR^{f5}$ wherein $R^{f4}$ is a perfluoropolyether group and $R^{f5}$ is a perfluoro hydrocarbon group; and said long chain hydrocarbon amine is represented by the formula;

$RNH_2$ in which R is a long chain hydrocarbon group.

8. A magnetic recording medium comprising a magnetic layer on non-magnetic base member and the lubricant in accordance with claim 7 on the surface of said magnetic layer.

9. A lubricant in accordance with claim 1, further admixed with at least one of phosphoric ester, phosphorous ester and long chain carboxylate ester.

10. A lubricant comprising:
    an ester compound including a perfluoropolyether with a carboxyl group at its end and a long chain alcohol,
    a long chain hydrocarbon amine, and at least one of phosphoric ester, phosphorous ester and long chain carboxylate ester, wherein said ester compound is represented by a formula chosen from the group consisting of:

$R^{f6}\text{—COOR}^6$;

and $R^6OCOR^{f6}COOR^6$ wherein $R^{f6}$ is a perfluoropolyether group and $R^6$ is a long chain hydrocarbon group; and said long chain amine is represented by the formula;

$RNH_2$ in which R is a long chain hydrocarbon group.

11. A magnetic recording medium comprising a magnetic layer on non-magnetic base member and the lubricant in accordance with claim 10 on the surface of said magnetic layer.

12. A lubricant in accordance with claim 1, wherein said long chain alkyl amine is admixed in said ester compound with an amount of from 0.01 to 100 in mole ratio.

* * * * *